United States Patent
Kotzur et al.

(10) Patent No.: US 11,334,261 B2
(45) Date of Patent: May 17, 2022

(54) SCALABLE RAID STORAGE CONTROLLER DEVICE SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/839,956

(22) Filed: Apr. 3, 2020

(65) Prior Publication Data

US 2021/0311647 A1 Oct. 7, 2021

(51) Int. Cl.
*G06F 3/06* (2006.01)
*G06F 13/40* (2006.01)

(52) U.S. Cl.
CPC .......... *G06F 3/0631* (2013.01); *G06F 3/0604* (2013.01); *G06F 3/0689* (2013.01); *G06F 13/4022* (2013.01); *G06F 13/4081* (2013.01)

(58) Field of Classification Search
CPC .... G06F 3/0604; G06F 3/0631; G06F 3/0689; G06F 13/4022; G06F 13/4081
See application file for complete search history.

(56) References Cited

U.S. PATENT DOCUMENTS

| | | | | |
|---|---|---|---|---|
| 7,711,793 B1 * | 5/2010 | Wilson | ................ | G06F 11/2089 709/217 |
| 8,654,628 B2 * | 2/2014 | Suzuki | ................ | G06F 11/2094 370/217 |
| 2006/0277347 A1 * | 12/2006 | Ashmore | ............ | G06F 11/2092 710/313 |
| 2007/0055909 A1 * | 3/2007 | Smith | ................ | G06F 11/1441 714/22 |
| 2007/0083707 A1 * | 4/2007 | Holland | ................ | G06F 3/0689 711/114 |
| 2010/0049914 A1 | 2/2010 | Goodwin | | |
| 2014/0337540 A1 * | 11/2014 | Johnson | ................ | G06F 13/14 710/5 |

(Continued)

*Primary Examiner* — Eric T Oberly
(74) *Attorney, Agent, or Firm* — Joseph Mencher

(57) ABSTRACT

A scalable RAID storage controller device system includes a host system coupled to a switch device by first and second NTB subsystems, first and second RAID storage devices connected to the switch device and provided in respective data storage device chassis having a storage device form factor, and first and second RAID storage controller devices connected to the switch device and provided in respective storage controller device chassis having the storage device form factor. The first RAID storage controller device executes commands received via the first NTB subsystem from the host system for a first RAID data storage system that it provides with the first RAID data storage system, and the second RAID storage controller device executes commands received via the second NTB subsystem from the host system for a second RAID data storage system that it provides with the second RAID data storage system.

20 Claims, 14 Drawing Sheets

(56) References Cited

U.S. PATENT DOCUMENTS

| | | | |
|---|---|---|---|
| 2016/0366226 A1* | 12/2016 | Friedman | G06F 3/0608 |
| 2018/0113831 A1* | 4/2018 | Hsieh | G06F 13/4081 |
| 2019/0197000 A1* | 6/2019 | Kurokawa | G06F 3/0604 |
| 2020/0210090 A1* | 7/2020 | Darisa | G06F 3/0688 |
| 2020/0226078 A1* | 7/2020 | Tanaka | G06F 13/28 |

* cited by examiner

SCALABLE RAID STORAGE CONTROLLER DEVICE SYSTEM

BACKGROUND

The present disclosure relates generally to information handling systems, and more particularly to providing RAID storage controller devices for use with high performance RAID data storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) data storage system that includes a plurality of RAID data storage devices. As will be appreciated by one of skill in the art, RAID data storage systems are provided by a data storage virtualization technology that combines the physical RAID data storage devices into one or more logical storage units for the purposes of data redundancy, performance improvements, and/or other benefits known in the art. For example, data in a RAID data storage system may be distributed across the RAID data storage devices using several different techniques that are referred to as "RAID levels" that provide different levels of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID data storage systems has been found to raise some issues.

For example, Non-Volatile Memory express (NVMe) storage devices (e.g., NVMe Solid State Drive (SSD) drives) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID data storage systems because the aggregate performance of the NVMe storage devices is typically much greater than the performance capabilities of the RAID storage controller provided for the RAID data storage system (and that performance is even projected to be much greater than the performance capabilities of next-generation RAID storage controllers), which results in those RAID storage controllers being unable to manage more than a few NVMe storage devices (e.g., conventional RAID storage controllers are currently capable of managing approximately four NVMe storage devices). As such, the use of NVMe storage devices in RAID data storage subsystems present RAID data storage system scaling issues, as the RAID storage controllers cannot scale with more than a few NVMe storage devices, and each RAID storage controller conventionally requires a PCIe add-in card slot that could otherwise be used for other types of peripheral devices.

Accordingly, it would be desirable to provide a RAID data storage system that addresses the issues discussed above.

SUMMARY

According to one embodiment, an Information Handling System (IHS) includes a Redundant Array of Independent Disks (RAID) storage controller chassis having a storage device form factor; a RAID storage controller connector that is included on the RAID storage controller chassis; a RAID storage controller processing system that is housed in the RAID storage controller chassis and that is coupled to the RAID storage controller connector; and a RAID storage controller memory system that is housed in the RAID storage controller chassis, that is coupled to the RAID storage controller processing system, and that includes instructions that, when executed by the RAID storage controller processing system, cause the RAID storage controller processing system to provide a RAID storage controller engine that is configured to: provide, in response to the connection of the RAID storage controller connector to a switch device, a first RAID data storage system that includes a plurality of first RAID data storage devices that are each connected to the switch device and that are each provided in a respective first data storage device chassis having the storage device form factor; and receive, via a first Non-Transparent Bridge (NTB) subsystem on the switch device, a first command for the first RAID data storage system that was generated by a host system; and perform the first command using at least one of the plurality of first RAID data storage devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
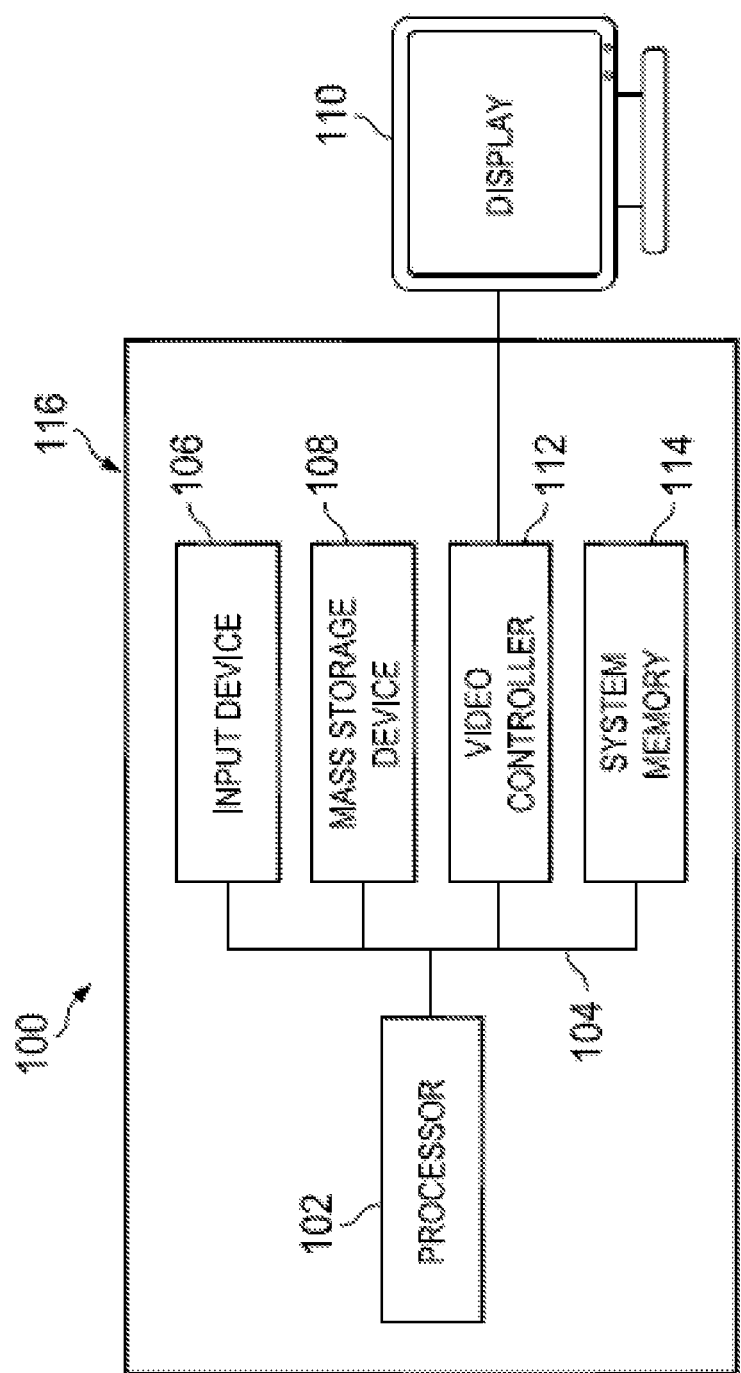
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
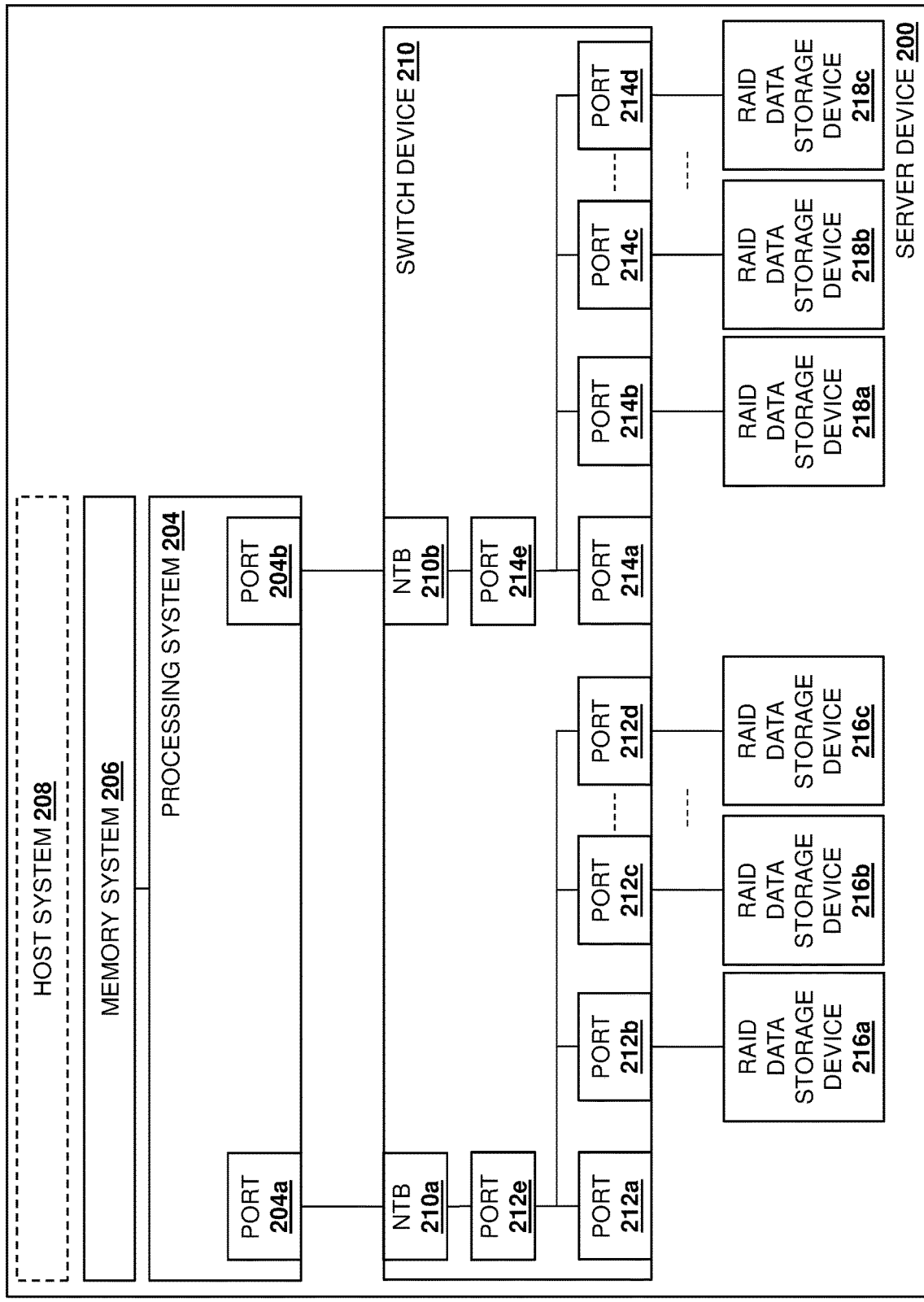
FIG. 2 is a schematic view illustrating an embodiment of a RAID data storage system.

Referring now to FIG. 2, a server device 200 is illustrated that includes a Redundant Array of Independent Storage (RAID) data storage system that provides an embodiment of the scalable RAID storage controller device system of the present disclosure. In an embodiment, the server device 200 may be provided by the IHS 100 discussed above with reference to FIG. 1, and/or may include some or all of the components of the IHS 100. However, while illustrated and described as a server device, one of skill in the art in possession of the present disclosure will recognize that the scalable RAID storage controller device system may be provided in a variety of systems while remaining within the scope of the present disclosure as well. In the illustrated embodiment, the server device 200 includes a server chassis 202 (e.g., the chassis 116 discussed above with reference to FIG. 1) that houses the components of the server device 200, only some of which are illustrated in FIG. 2. However, as will be appreciated by one of skill in the art in possession of the present disclosure, while the RAID data storage system providing the scalable RAID storage controller device system of the present disclosure is illustrated as being provided entirely in the server chassis 200, in other embodiments, the RAID data storage system may be distributed across multiple chassis, and/or in any other manner that would be apparent to one of skill in the art in possession of the present disclosure. In the examples below, RAID storage controller devices and RAID data storage devices (discussed below) may be provided in a "storage drive bay" defined by the server chassis 202, although one of skill in the art in possession of the present disclosure will recognize that the storage drive bay may be replaced with other chassis coupling features while remaining within the scope of the present disclosure as well. As such, the RAID data storage system providing the scalable RAID storage controller device system discussed herein may be provided in a variety of configurations and manners while remaining within the scope of the present disclosure as well.

In the illustrated embodiment, the server chassis 202 houses a processing system 204 and a memory system 206 that is connected to the processing system 204. As discussed below, the memory system 206 may include instructions that, when executed by the processing system 204, cause the processing system 204 to provide a host system 208 that is configured to perform the functions of the host systems and processing systems discussed below. However, while a specific host system 208 is described, one of skill in the art in possession of the present disclosure will recognize that host systems that operate similarly to the host system 208 discussed below may be provided in a variety of manners that will fall within the scope of the present disclosure as well.

In the illustrated embodiment, the server chassis 202 also houses a switch device 210 that is coupled to the processing system 204. For example, the switch device 210 may be provided by a Peripheral Component Interconnect Express (PCIe) switch device, and may include a port (not illustrated, but which may include an Upstream Port (USP) in the example provided below, or other ports known in the art)

that is directly connected to a port 204a (e.g., a root port such as a PCIe root port, or other ports known in the art) on the processing system 204, and that has been configured as a Non-Transparent Bridge (NTB) subsystem 210a, as well as a port (not illustrated, but which may include a USP in the example provided below, or other ports known in the art) that is directly connected to a port 204b (e.g., a root port such as a PCIe root port, or other ports known in the art) on the processing subsystem 204, and that has been configured as an NTB subsystem 210b.

For example, one of skill in the art in possession of the present disclosure will recognize that switch ports in the switch device 210 that are connected to the processing system 204 may be configured as NTB subsystems 210a and 210b by including PCIe NTB logic that connects the memory system 206 to a PCIe fabric, and that includes NTB logic that supports doorbell registers, memory translation windows, scratchpad registers, memory registers, and/or other NTB feature sets known in the art. Furthermore, as discussed below, each of the NTB subsystems 210a and 210b may be configured to present themselves to the processing system 204 as a single RAID data storage device (e.g., a single NVMe storage device). However, while discussed as being configured as NTB subsystems, one of skill in the art in possession of the present disclosure will recognize that the ports directly connected to the processing system 204 may be configured in other manners to provide the functionality of the NTB subsystems 210a and 210b discussed below. As such, while a specific switch device 210 is described above, one of skill in the art in possession of the present disclosure will appreciate that other switch devices will fall within the scope of the present disclosure as well.

In the illustrated embodiment, the server chassis 202 also houses a RAID storage system that, in the examples provided below, include a plurality of RAID data storage devices 216a, 216b, and up to 216c, as well as a plurality of RAID data storage devices 218a, 218b, and up to 218c. In the embodiments discussed below, the RAID data storage devices 216a-216c and 218a-218c are described as being provided by Non-Volatile Memory express (NVMe) Solid State Drives (SSDs), but one of skill in the art in possession of the present disclosure will recognize that other types of storage devices with similar functionality as the NVMe SSDs (e.g., NVMe PCIe add-in cards, NVMe M.2 cards, etc.) may be implemented according to the teachings of the present disclosure and thus will fall within its scope as well. As discussed above, the use of NVMe storage devices as the RAID data storage devices 216a-216c and 218a-218c of the present disclosure may overload even the most capable of RAID storage controller devices, as even with the offloading of data transfer operations from the RAID storage controller device by the RAID data storage devices (discussed below), the relatively high performance capabilities of NVMe storage devices can overload a RAID storage controller device that only services commands and completions associated with its connected RAID data storage devices (e.g., even a handful of NVMe storage devices can overload a relatively capable RAID System on Chip (SoC)).

In the illustrated embodiment, the switch device 210 includes a port 212b (e.g., a Switch Downstream Port (DSP) in the example provided below, or other ports known in the art) that is directly connected to the RAID data storage device 216a, a port 212c (e.g., a Switch DSP in the example provided below, or other ports known in the art) that is directly connected to the RAID data storage device 216b, and up to a port 212d (e.g., a Switch DSP in the example provided below, or other ports known in the art) that is directly connected to the RAID data storage device 216c. Similarly, the switch device 210 also includes a port 214b (e.g., a Switch DSP in the example provided below, or other ports known in the art) that is directly connected to the RAID data storage device 218a, a port 214c (e.g., a Switch DSP in the example provided below, or other ports known in the art) that is directly connected to the RAID data storage device 218b, and up to a port 212d (e.g., a Switch DSP in the example provided below, or other ports known in the art) that is directly connected to the RAID data storage device 218c.

In the illustrated embodiment, the NTB subsystem 210a may be coupled to each of the ports 212b, 212c, and up to 212d, as well as to a port 212a (e.g., which may be provided by a Switch Upstream Port (USP) in the example provided below, or other ports known in the art) via a port 212e (e.g., a Switch DSP in the example provided below, or other ports known in the art) and a logical PCIe bus. As discussed below, the port 212a is also coupled to each of the ports 212b, 212c, and up to 212d, in order to allow a RAID storage controller device (discussed below) that is provided according to the teachings of the present disclosure to be connected to the port 212a in order to communicate with the RAID data storage devices 216a, 216b, and up to 216c that are connected to the ports 212b, 212c, and up to 212d, respectively. As will be appreciated by one of skill in the art in possession of the present disclosure, the NTB subsystem 210a may provide a USP that is visible to the processing system 204, and may also provide a USP that is connected to the port 212e (e.g., a Switch DSP) and that is visible to a RAID storage controller device connected to the port 212a.

Similarly, in the illustrated embodiment, the NTB subsystem 210b may be coupled to each of the ports 214b, 214c, and up to 214d, as well as to a port 214a (e.g., which may be provided by a Switch USP in the example provided below, or other ports known in the art) via a port 214e (e.g., a Switch DSP in the example provided below, or other ports known in the art) and a logical PCIe bus. As discussed below, the port 214a is also coupled to each of the ports 214b, 214c, and up to 214d, in order to allow a RAID storage controller device (discussed below) that is provided according to the teachings of the present disclosure to be connected to the port 214a in order to communicate with the RAID data storage devices 218a, 218b, and up to 218c that are connected to the ports 214b, 214c, and up to 214d, respectively. As will be appreciated by one of skill in the art in possession of the present disclosure, the NTB subsystem 210b may provide a USP that is visible to the processing system 204, and may also provide a USP that is connected to the port 214e (e.g., a Switch DSP) and that is visible to a RAID storage controller device connected to the port 214a. As discussed in further detail below, the switch device 210 may be configurable to provide the connections between the NTB subsystem 210a and the ports 212a-212d illustrated in FIG. 2, as well as provide the connections between the NTB subsystem 210b and the ports 214a-214d illustrated in FIG. 2, and thus the specific connection configuration for the NTB subsystems 210a and 210b and the ports 212a-212d and 214a-214b, respectively, may change while remaining within the scope of the present disclosure as well.

In an embodiment, each of the RAID data storage devices 216a-216c and 218a-218c may be provided in a respective storage device chassis provided with a storage device form factor such as, for example, a Small Form Factor (SFF)-8201: 2.5" Form Factor Drive Dimensions ("SFF-8201" below) storage device form factor (sometimes referred to as a "U.2" storage device form factor). However, while a specific storage device form factor is described above, other storage device form factors will fall within the scope of the present disclosure as well. For example, the Storage Networking Industry Association (SNIA) Storage Form Factor (SFF) working group has defined an "E1" form factor in the SFF-Technology Affiliate (TA)-1006 specification, and an "E3" form factor in the SFF-TA-1008 specification, and either of those form factors will fall within the scope of the present disclosure as well. As discussed above, the server chassis 202 may define a storage device bay or other housing that is configured to house the RAID data storage devices 216a-216c and 218a-218c, and the server chassis 202 may include respective storage device bay coupling features adjacent to each port 212b-212d and 214b-214d for coupling storage devices having the storage device form factor (provided for the RAID data storage devices 216a-216c and 218a-218c) to the server device chassis 202. Similarly, the storage device bay defined by the server chassis 202 may be configured to house the RAID storage controller devices providing according to the teachings of the present disclosure, and the server chassis 202 may include storage device bay coupling features adjacent each port 212a and 214a for coupling RAID storage controller devices having the storage device form factor to the server device chassis 202 as well.

As such, in some examples, the connection of the RAID data storage devices 216a-216c and 218a-218c to the ports 212b-212d and 214b-214d, respectively, may utilize PCIe SFF-8639 Module Specification ("SFF-8639" below) connector systems (e.g., including SFF-8639 connectors provided for the ports 212b-212d and 214b-214d, as well as SFF-8639 connectors provided on the RAID data storage devices 216a-216c and 218a-218c), sometimes referred to as "U.2" connector systems. Furthermore, the ports 212a and 214a may be provided using SFF-8639 connectors in order to connect to the RAID storage controller devices provided according to the teachings of the present disclosure as well. However, while a specific connector system is described above, other connector systems will fall within the scope of the present disclosure as well. For example, as discussed above the SNIA SFF working group has defined an "E1" form factor in the SFF-TA-1006 specification, and an "E3" form factor in the SFF-TA-1008 specification, and devices provided in either of those form factors may include connectors that are defined in the SFF-TA-1002 specification will fall within the scope of the present disclosure as well.

One of skill in the art in possession of the present disclosure will recognize that the embodiment illustrated in FIG. 2 allows for the provisioning of two separate RAID data storage systems that are each controlled by respective RAID storage controller devices that are provided according to the teachings of the present disclosure. However, one of skill in the art in possession of the present disclosure will also appreciate that the example discussed below is simplified for discussion and illustration purposes, and that the switch device 210 may be configured to allow for many more separate RAID data storage systems to be provided in the server device 200 while remaining within the scope of the present disclosure as well. For example, conventional server devices may include 24 ports that are similar to the ports 212a-212d and 214a-214d illustrated in FIG. 2 and, as such, may allow a similar server device to provide 6 separate RAID data storage systems (e.g., with a 1:3 RAID storage controller device/RAID data storage device ratio as illustrated in FIG. 2) using the teachings of the present disclosure. As such, while only two RAID data storage systems are discussed below as being provided using the scalable RAID storage device system of the present disclosure, the provisioning of any number of RAID data storage systems will fall within the scope of the present disclosure as well.

Figure 3:
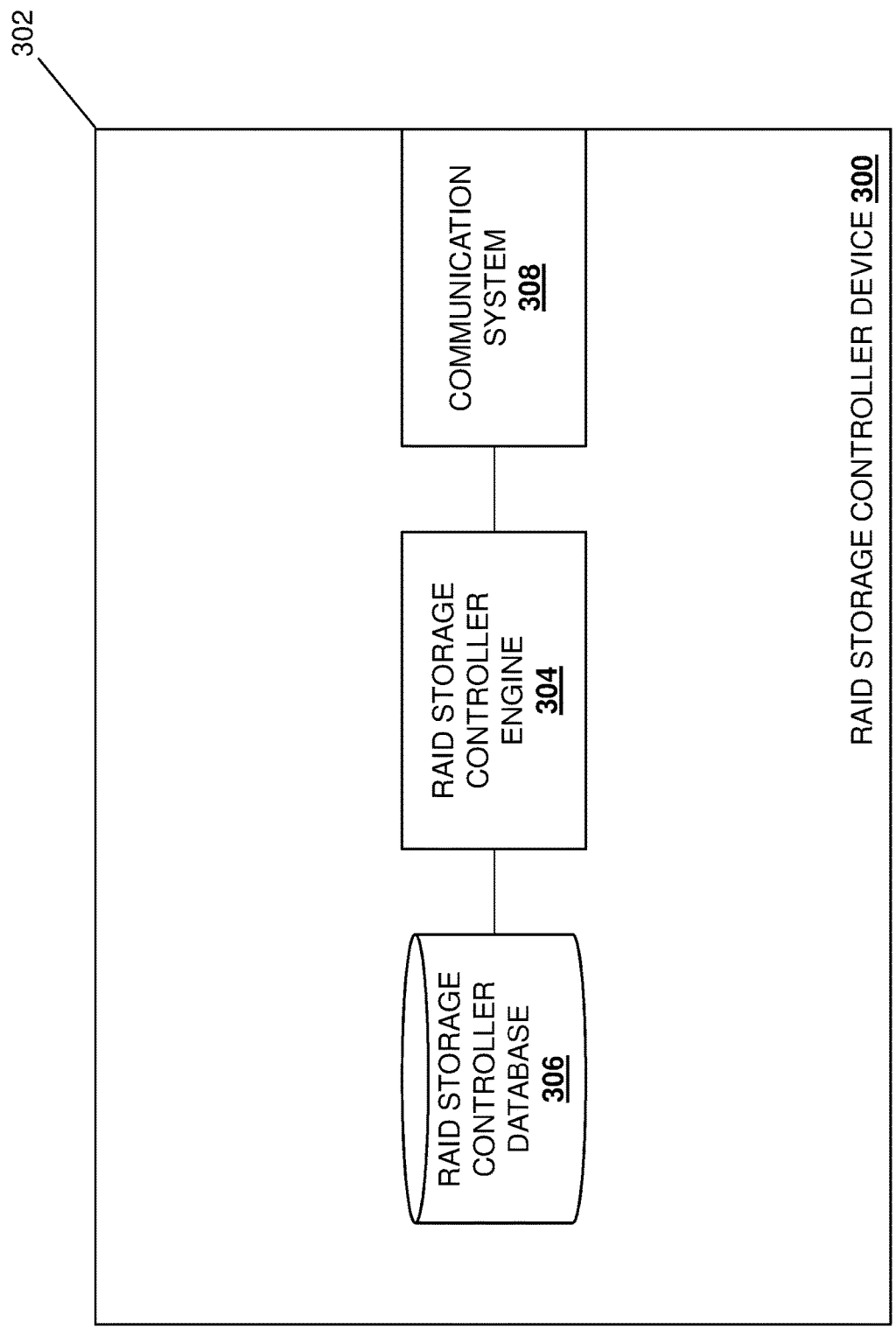
FIG. 3 is a schematic view illustrating an embodiment of a RAID storage controller device that may be provided in the RAID data storage system of FIG. 2.

Referring now to FIG. 3, an embodiment of a RAID storage controller device 300 is illustrated that may be provided in the server device 200 discussed above with reference to FIG. 2. In an embodiment, the RAID storage controller device 300 may be provided by the IHS 100 discussed above with reference to FIG. 1 and/or may include some or all of the components of the IHS 100. Furthermore, while illustrated and discussed as a RAID storage controller device 300, one of skill in the art in possession of the present disclosure will recognize that the functionality of the RAID storage controller device 300 discussed below may be provided by other devices that are configured to operate similarly as discussed below. In the illustrated embodiment, the RAID storage controller device 300 includes a chassis 302 that houses the components of the RAID storage controller device 300, only some of which are illustrated below. As discussed above, the chassis 302 may be provided with a storage device form factor that is the same as provided for the storage device chassis utilized by each RAID data storage device 216a-216c and 218a-218c discussed above with reference to FIG. 2, and in the specific examples provided herein includes a chassis with a SFF-8201 storage device form factor provided for storage devices.

The chassis 302 may house a processing system (not illustrated, but which may include a processor similar to the processor 102 discussed above with reference to FIG. 1) and a memory system (not illustrated, but which may include a memory similar to the memory 114 discussed above with reference to FIG. 1) that is coupled to the processing system and that includes instructions that, when executed by the processing system, cause the processing system to provide a RAID storage controller engine 304 that is configured to perform the functionality of the RAID storage controller engines and/or RAID storage controller devices discussed below. The chassis 302 may also house a storage system (not illustrated, but which may include the storage 108 discussed above with reference to FIG. 1) that is coupled to the RAID storage controller engine 304 (e.g., via a coupling between the storage system and the processing system) and that includes a RAID storage controller database 306 that is configured to store any of the information utilized by the RAID storage controller engine 304 discussed below.

The chassis 302 may also house a communication system 308 that is coupled to the RAID storage controller engine 304 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As will be appreciated by one of skill in the art in possession of the present disclosure, the communication system 308 may include a connector that is configured to connect to the ports 212a and 214a on the switch device 210 discussed above with reference to FIG. 2. As such, in some examples, the communication system 308 may include a SFF-8639 connector as discussed above. However, while a specific RAID storage controller device 300 has been illustrated, one of skill in the art in possession of the present disclosure will recognize that RAID storage controller devices (or other devices operating according to the teachings of the present disclosure in a manner similar to that described below for the RAID storage controller device 300)

may include a variety of components and/or component configurations for providing conventional RAID storage controller device functionality, as well as the functionality discussed below, while remaining within the scope of the present disclosure as well.

Figure 4:
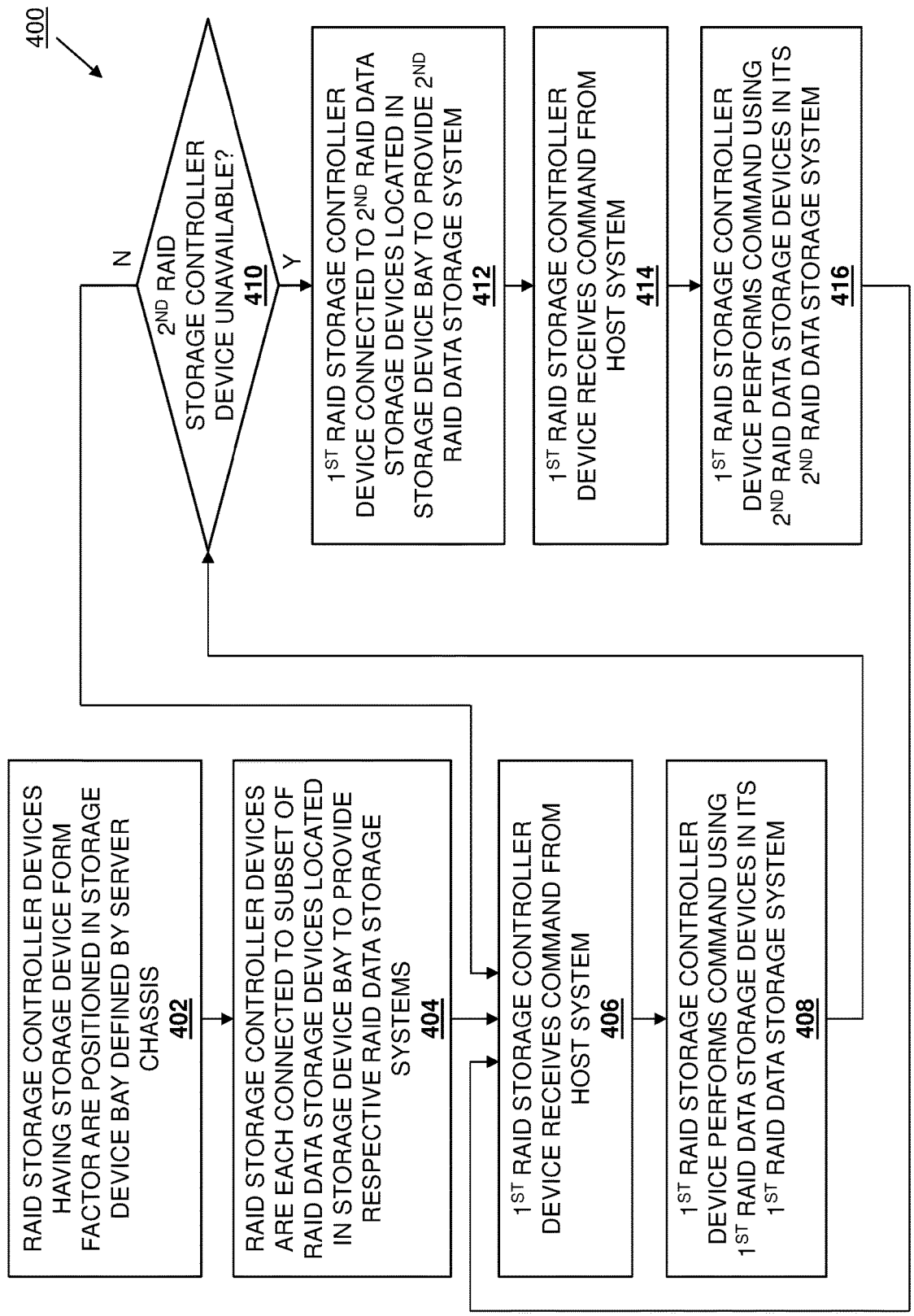
FIG. 4 is a flow chart illustrating an embodiment of a method for providing scalable RAID storage controller devices.

Referring now to FIG. 4, an embodiment of a method 400 for providing scaling RAID storage controller devices is illustrated. As discussed below, the systems and methods of the present disclosure provide RAID storage controller devices in storage controller device chassis that have a storage device form factor that is the same as the storage device chassis utilized by the RAID data storage devices which those RAID storage controller devices control. As such, the RAID storage controller devices of the present disclosure may be provided in the same storage device bay on the server device as the RAID data storage devices, which allows respective RAID storage controller devices to be connected to respective subsets of the RAID data storage devices to provide respective RAID data storage systems in the server device. Thus, the RAID storage controller devices of the present disclosure may be provided in a scalable manner with relatively high performance RAID data storage devices (such as the NVMe storage devices discussed above) in a RAID data storage system by providing respective RAID storage controller devices to control each subset of those RAID data storage devices that they are capable of controlling, with the RAID storage controller devices provided in storage devices slots and connected to storage device connectors rather than using up other device connectors (e.g., peripheral device connectors such as PCIe card add-in slots) in the server device that could otherwise be used for other types of devices.

Figure 5:
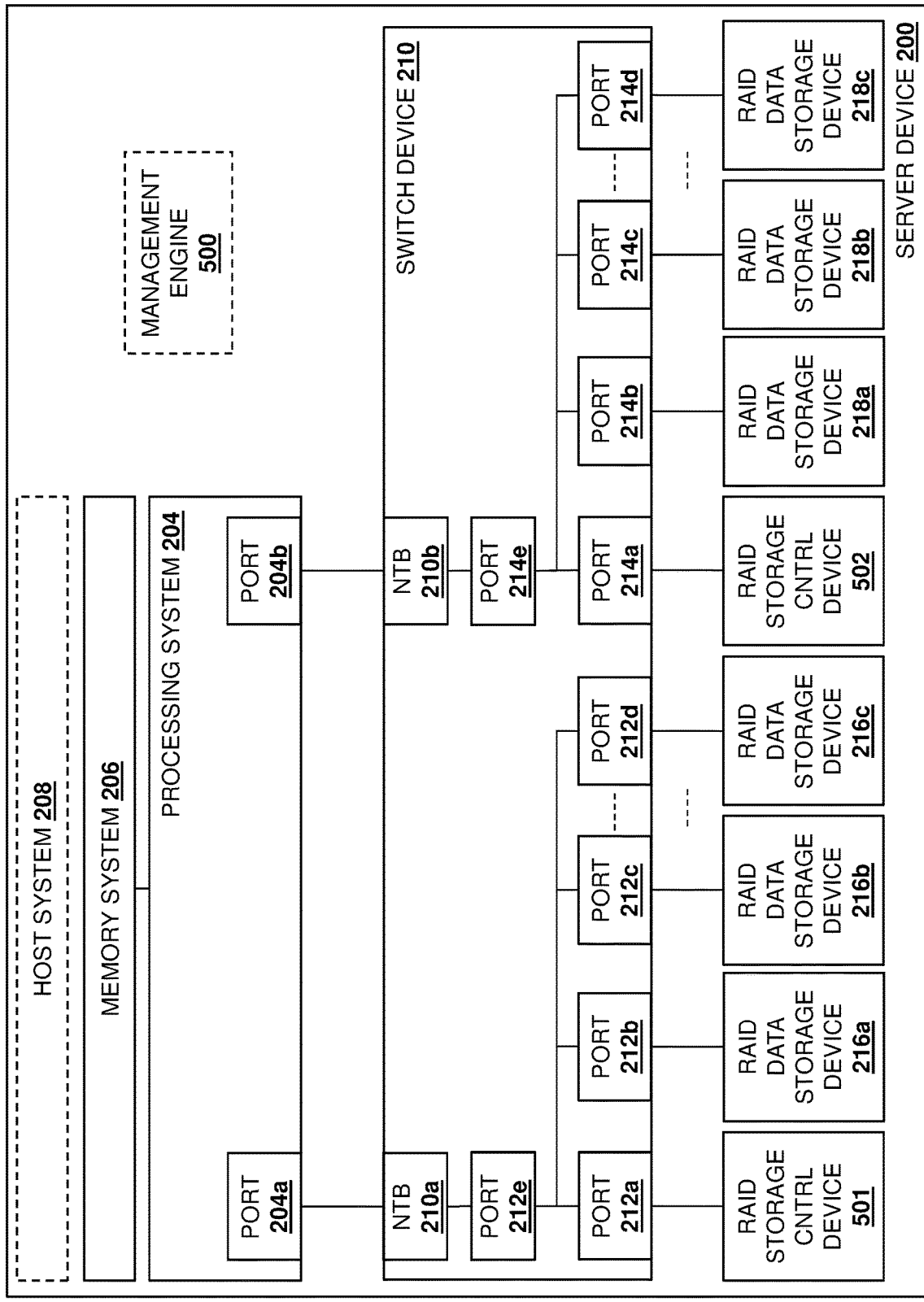
FIG. 5 is a schematic view illustrating an embodiment of the RAID data storage system of FIG. 2 including multiple RAID storage controller devices of FIG. 3 during the method of FIG. 4.

As illustrated in FIG. 5, in an embodiment, a management engine 500 may be provided to configure the server device 200 to provide the scalable RAID storage controller devices of the present disclosure. As will be appreciated by one of skill in the art in possession of the present disclosure, the management engine 500 may be provided by a memory system that includes instructions that, when executed by a processing system, cause the processing to provide the management engine 500 that is configured to perform the functionality of the management engines discussed below. In some examples, the management engine 500 may be provided by the processing system 204 and memory system 206 in the server device 200 (e.g., a Basic Input/Output System (BIOS)), by a processing system and memory system in the switch device 210, or by a processing system and memory system provided in a Baseboard Management Controller (BMC) such as the integrated DELL® Remote Access Controller (iDRAC) available from DELL® Inc. of Round Rock, Tex., United States (which may be provided in the server chassis 202 of the server device 200, or external to the server chassis 202 of the server device 200). However, while a few examples have been described, one of skill in the art in possession of the present disclosure will appreciate that the management engine 500 and/or management engine functionality discussed below may be provided by a variety of different subsystems while remaining within the scope of the present disclosure as well.

In an embodiment, during or prior to the method 400, the management engine 500 may operate to program the NTB subsystems 210a and 210b with logic that sets up NTB subsystem memory claim ranges in order to configure the NTB subsystem 210a to claim memory addresses in the memory system 206, as well as to configure the NTB subsystem 210b to claim memory addresses in the memory system 206 as well. As discussed below, such programming of the NTB subsystems 210a and 210b provides for the routing of data transfers and/or other communications between the processing system 204 and the RAID data storage devices 216a-216c and 218a-218c.

For example, as discussed below, the RAID data storage devices 216a-216c and 218a-218c (e.g., NVMe storage devices) may perform Direct Memory Access (DMA) operations that target the memory system 206 by specifying memory address(es) in the memory system 206, and the switch device 210 may be configured to route those DMA operations to the NTB subsystems 210a or 210b by programming the NTB subsystems 210a and 210b to claim memory addresses (identified in DMA operations) that are included in the memory system 206. In a specific example, the memory system 206 may include 8 GB of memory designated as a "0-8 GB" memory address range. As such, in one example, the NTB subsystem 210a may be programmed to claim memory addresses included in the "0-8 GB" memory address range and route DMA operations from the RAID data storage devices 216a-216c that are directed to those memory addresses to the processing system 204, while the NTB subsystem 210b may be programmed to claim memory addresses included in the "0-8 GB" memory address range and transmit DMA operations from the RAID data storage devices 218a-218c that are directed to those memory addresses directly to the processing subsystem 204 as well.

While the programming of the NTB subsystems 210a and 210b is discussed above as being provided by a "static mapping" that is set up prior to operation of the scalable RAID storage controller device system 200, one of skill in the art in possession of the present disclosure will recognize that a RAID storage controller engine in a RAID storage controller device may be configured to program the NTB subsystems 210a and 210b as data transfers and/or other communications are received by that RAID storage controller device (e.g., by setting up a translation window for each I/O command received by the RAID storage controller device.) As such, a wide variety of modification of the NTB subsystem programming discussed above is envisioned as falling within the scope of the present disclosure.

As discussed in further detail below, the NTB subsystems 210a and 210b may be configured to present themselves as respective RAID data storage devices in a RAID data storage system. As will be appreciated by one of skill in the art in possession of the present disclosure, each of the NTB subsystems 210a and 210b in the switch device 210 may "block" the view of the components behind them (e.g., from the perspective of the processing system 204) and present themselves as a respective, single RAID data storage device (e.g., a single NVMe storage device). As such, the NTB subsystem 210a may present itself to the processing system 204 as a single RAID data storage device/NVMe storage device such that the processing system 204 "believes" it is connected directly to a single RAID data storage device/NVMe storage device, and the NTB subsystem 210b may present itself to the processing system 204 as a single RAID data storage device/NVMe storage device such that the processing system 204 "believes" it is connected directly to a single RAID data storage device/NVMe storage device. As will be understood by one of skill in the art in possession of the present disclosure and as discussed below, the NTB subsystems 210a and 210b configured in such a manner will operate to forward communications received from the processing system 204 to their connected RAID storage controller device, discussed below.

Furthermore, as discussed above, the switch device 210 may be configurable to provide the connections between the NTB subsystem 210a and the ports 212a-212d illustrated in FIG. 5, as well as the NTB subsystem 210a and the ports 212a-212d illustrated in FIG. 5. As such, in some embodiments of the method 400, the management engine 500 may operate to configure the connections provided by the switch device 210 between the NTB subsystems 210a and 210b and the ports 212a-212d and 214a-214d, respectively, in order to provide the connections illustrated in FIG. 5. However, in other embodiments of the method 400, the connections between the NTB subsystem 210a and the ports 212a-212d illustrated in FIG. 5, as well as the NTB subsystem 210a and the ports 212a-212d illustrated in FIG. 5, may be a default configuration while remaining within the scope of the present disclosure as well.

The method 400 begins at block 402 where RAID storage controller devices having storage device form factors are positioned in a storage device bay defined by a server chassis. In an embodiment at block 402, a RAID storage controller device 501 that may be provided by the RAID storage controller device 300 discussed above with reference to FIG. 3 is positioned in a storage device bay defined by the server chassis 200, and a RAID storage controller device 502 that may also be provided by the RAID storage controller device 300 discussed above with reference to FIG. 3 is positioned in a storage device bay defined by the server chassis 200, also illustrated in FIG. 5. As discussed above, each of the RAID storage controller devices 501 and 502 may include a storage controller chassis that has a storage device form factor that is the same as the storage device form factor of the storage device chassis provided for each of the RAID data storage devices 216a-216c and 218a-218c. As such, each of the RAID storage controller devices 501 and 502 and the RAID data storage devices 216a-216c and 218a-218c may be positioned anywhere in a storage device bay defined by the server chassis 202, as each of the RAID storage controller devices 501 and 502 and the RAID data storage devices 216a-216c and 218a-218c includes the same storage device form factor (and storage device connectors.)

The method 400 then proceeds to block 404 where the RAID storage controller devices are each connected to a subset of RAID data storage devices located in the storage device bay to provide respective RAID data storage systems. In an embodiment, at block 404, the RAID storage controller device 501 may be connected to the switch device 210 to connect it to the RAID data storage devices 216a-216c, and the RAID storage controller device 502 may be connected to the switch device 210 to connect it to the RAID data storage devices 218a-218c. For example, the RAID storage controller device 501 may include a storage device connector (e.g., a SFF-8639 connector) that is configured to connect to the port 212a (e.g., a SFF-8639 connector) on the switch device 210 in order to connect the RAID storage controller device 501 to the NTB subsystem 210a and the RAID data storage devices 216a-216c (i.e., due to the connection configuration of the switch device 210 illustrated in FIG. 5) and provide a first RAID data storage system/RAID domain that includes the RAID storage controller device 501 and the RAID data storage devices 216a-216c.

Similarly, the RAID storage controller device 502 may include a storage device connector (e.g., a SFF-8639 connector) that is configured to connect to the port 214a (e.g., a SFF-8639 connector) on the switch device 210 in order to connect the RAID storage controller device 502 to the NTB subsystem 210b and the RAID data storage devices 218a-218c (i.e., due to the connection configuration of the switch device 210 illustrated in FIG. 5) and provide a second RAID data storage system/RAID domain that includes the RAID storage controller device 502 and the RAID data storage devices 218a-218c. In some embodiments, the connection of the RAID storage controller devices 501 and 502 to the ports 212a and 214a may include "hot-plugging" the RAID storage controller devices 501 and 502 to the switch device 210 by connecting the RAID storage controller devices 501 and 502 to the ports 212a and 214a while the RAID data storage devices 216a-216c and 218a-218c are operating.

As will be appreciated by one of skill in the art in possession of the present disclosure, the storage device connectors provided on the RAID storage controller devices 501 and 502 may be the same type of storage device connectors as those provided on the RAID data storage devices 216a-216c and 218a-218c, and thus allows either of the RAID storage controller devices 501 and 502 (and any of the RAID data storage devices 216a-216c and 218a-218c) to be connected to any of the ports 212a-212d and 214a-214d. Furthermore, in some embodiments, the management engine 500 may be configured to detect the connection (e.g., the "hot-plugging") of the RAID storage controller devices 501 and 502 and, in response, configure the connections in the switch device 210 between the NTB subsystem 210a and the ports 212a-212d, and between the NTB subsystem 210b and the ports 214a-214d. As such, in one example, the management engine 500 may be configured to detect the connection of RAID storage controller devices to the switch device 210 and, in response, configure the connections provided by the switch device 210 to "split" the RAID data storage devices connected to the switch device 210 between the RAID data storage devices connected to the switch device 210. Furthermore, in specific examples, the management engine 500 may be configured to identify capabilities of the RAID storage controller devices connected to the switch device 210, and then "split" the RAID data storage devices connected to the switch device 210 between the RAID storage controller devices connected to the switch device 210 based on the relative capabilities of those RAID storage controller devices (e.g., with relatively more capable RAID storage controller devices connected to more RAID data storage devices, and relatively less capable RAID storage controller devices connected to fewer RAID data storage devices.)

In an embodiment, following the connection of the RAID storage controller devices 501 and 502 to the switch device 210, the RAID storage controller devices 501 and 502 may identify their connected RAID data storage devices 216a-216c and 218a-218c, respectively, in order to determine the storage space provided by those connected RAID data storage devices. In some examples, the RAID storage controller devices 501 and 502 may then spoof storage space provided in their respective RAID data storage systems by the RAID data storage devices that provide that RAID data storage system. As such, the RAID storage controller engine 304 in the RAID storage controller device 501/300 may operate to spoof a storage space provided by the first RAID data storage system that includes the RAID data storage devices 216a-216c, and the RAID storage controller engine 304 in the RAID storage controller device 502/300 may operate to spoof a storage space provided by the second RAID data storage system that includes the RAID data storage devices 218a-218c. As would be understood by one of skill in the art in possession of the present disclosure, the RAID data storage devices 216a-216c and 218a-218c (e.g., NVMe storage devices) provide respective storage spaces for the first and second RAID data storage systems, respectively, that is referred to as a "namespace" in NVMe systems, a "Logical Unit Number (LUN)" in Small Computer System Interface (SCSI) systems, and a "virtual drive" in RAID systems.

Thus, in an example in which the RAID data storage devices are NVMe storage devices, the RAID storage controller engine 304 in the RAID storage controller device 501 may operate to spoof an NVMe namespace that provides the RAID virtual drive in the first RAID data storage system, which one of skill in the art in possession of the present disclosure will recognize may be presented to the processing systems 204 such that the processing system 204 "believes" they are communicating with a single NVMe storage device/namespace/RAID virtual drive. For example, NVMe controllers in the NVMe RAID data storage devices 216a-216c may be spoofed by a combination of the NTB subsystems 210a and the RAID storage controller device 501, with the RAID storage controller device 501 also spoofing an NVMe namespace. As will be appreciated by one of skill in the art in possession of the present disclosure, the NVMe namespace spoofed by the RAID storage controller device 501 may represent a single NVMe RAID data storage device, may represent a virtual RAID volume provided by the NVMe RAID data storage device(s) 216a-216c, and/or may represent any other storage space that would be apparent to one of skill in the art in possession of the present disclosure.

Similarly, the RAID storage controller engine 304 in the RAID storage controller device 502 may operate to spoof an NVMe namespace that provides the RAID virtual drive in the second RAID data storage system, which one of skill in the art in possession of the present disclosure will recognize may be presented to the processing systems 204 such that the processing system 204 "believes" they are communicating with a single NVMe storage device/namespace/RAID virtual drive. For example, NVMe controllers in the NVMe RAID data storage devices 218a-218c may be spoofed by a combination of the NTB subsystems 210b and the RAID storage controller device 502, with the RAID storage controller device 502 also spoofing an NVMe namespace. As will be appreciated by one of skill in the art in possession of the present disclosure, the NVMe namespace spoofed by the RAID storage controller device 502 may represent a single NVMe RAID data storage device, may represent a virtual RAID volume provided by the NVMe RAID data storage device(s) 218a-218c, and/or may represent any other storage space that would be apparent to one of skill in the art in possession of the present disclosure.

As such, NVMe namespaces may be presented to the processing system 204 as a single namespace, while on the "backend" the RAID storage controller devices 501 and 502 may mirror data across two different RAID data storage devices in their respective RAID data storage systems, may perform RAID 5 operations across the RAID data storage devices in their respective RAID data storage systems, and/or may perform any other storage operations that would be apparent to one of skill in the art in possession of the present disclosure. However, while a specific example of NVMe storage devices providing a RAID storage system have been described, one of skill in the art in possession of the present disclosure will recognize that the RAID storage controller devices of the present disclosure may spoof a storage space for any storage system utilizing any types of storage devices while remaining within the scope of the present disclosure as well.

Figure 6A:
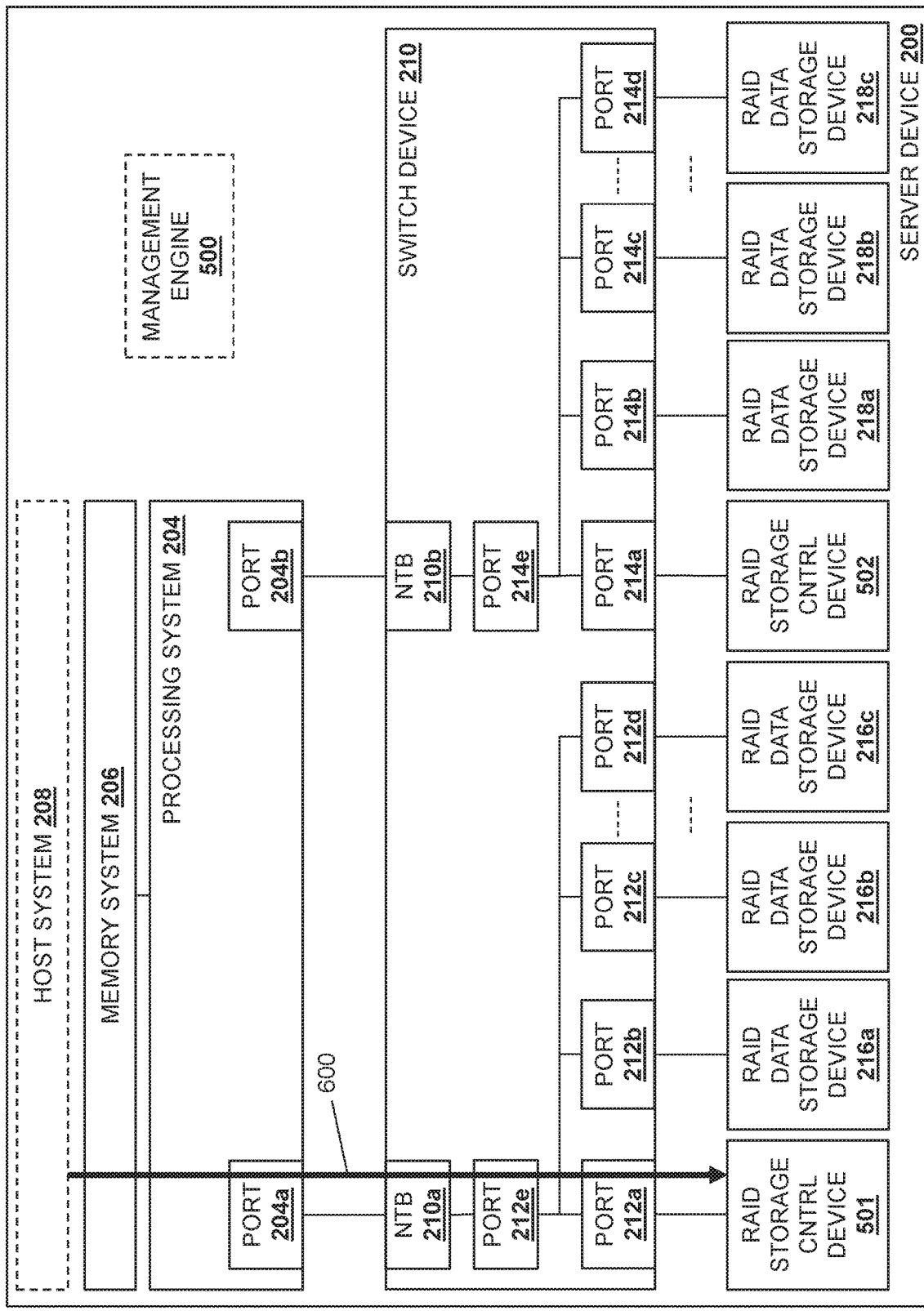
FIG. 6A is a schematic view illustrating an embodiment of the RAID data storage system of FIG. 5 operating during the method of FIG. 4.

The method 400 then proceeds to block 406 where a first RAID storage controller device receives a command. With reference to FIG. 6A, in an embodiment of block 406, the host system 208 may generate a command 600 that instructs a data transfer operation associated with the first RAID data storage system provided by the RAID storage controller device 501 and the RAID data storage devices 216a-216c, and transmit that command 600 via the port 204a on the processing system 204 to the NTB subsystem 210a in the switch device 210. As discussed above, the NTB subsystem 210a presents itself to the processing subsystem 202 as a single RAID data storage device (e.g., a single NVMe storage device) and, upon receiving the command 600, may operate to forward that command 600 received from processing subsystem 204 via the port 204a to the RAID storage controller device 501 connected to the port 212a. As will be appreciated by one of skill in the art in possession of the present disclosure, the RAID storage controller device 502 may receive commands from the host system 208 in a similar manner.

The method 400 then proceeds to block 408 where the first RAID storage controller system performs the command using first RAID data storage devices in its first RAID data storage system. In an embodiment, at block 408, the RAID storage controller device 501 may operate to perform the command 600 using one or more of the RAID data storage devices 216a-216c in its first RAID data storage system, and one of skill in the art in possession of the present disclosure will appreciate how the RAID storage controller device 502 may operate to perform commands in a similar manner using one or more of the RAID data storage devices 218a-218c as well. The inventors of the present disclosure describe techniques for performance of a command by a RAID storage controller device and RAID data storage devices in U.S. patent application Ser. No. 16/813,145, filed on Mar. 9, 2020, the disclosure of which is incorporated herein by reference in its entirety. In that application, data update operations are described as being performed by a RAID storage controller device provided in a "look-aside" RAID storage controller device configuration, along with the RAID data storage devices coupled to that RAID storage controller device, and one of skill in the art in possession of the present disclosure will appreciate how the RAID storage controller devices 501 and 502 coupled to the RAID data storage devices 216a-216c and 218a-218c, respectively, may be considered as being configured in the "look-aside" RAID storage controller device configuration described in that application.

For example, U.S. patent application Ser. No. 16/813,145 discussed above describes a "look-aside" RAID storage controller device may send commands to each of the RAID primary data storage device(s) experiencing a data update and, in response to that command, each of those RAID primary data storage device(s) may operate to perform respective DMA operation(s) to retrieve their updated primary data, perform XOR operations on their current primary data and their updated primary data to produce interim parity data, and overwrite their current primary data with the updated primary data. The "look-aside" RAID storage controller device may then send a command to the RAID parity data storage device and, in response to that command, the RAID parity data storage device may perform DMA operation(s) to retrieve the interim parity data produced by each of the RAID primary data storage device(s), perform an XOR operation of that interim parity data and its current parity data to produce updated parity data, and overwrite its current parity data with the updated parity data. As such, data update operations may be offloaded from the "look aside" RAID storage controller device, thus increasing the ability of the RAID storage controller device to scale with high performance RAID storage devices, and/or allowing for the use of a RAID storage controller device with relatively lower capabilities (e.g., a "control-plane-only" RAID storage controller device.) However, while particular data update operations performed using a "look-aside" RAID storage controller device and RAID data storage devices is described above, one of skill in the art in possession of the present disclosure will appreciate how data update operations may be performed in a variety of manners while remaining within the scope of the present disclosure as well.

Figure 6B:
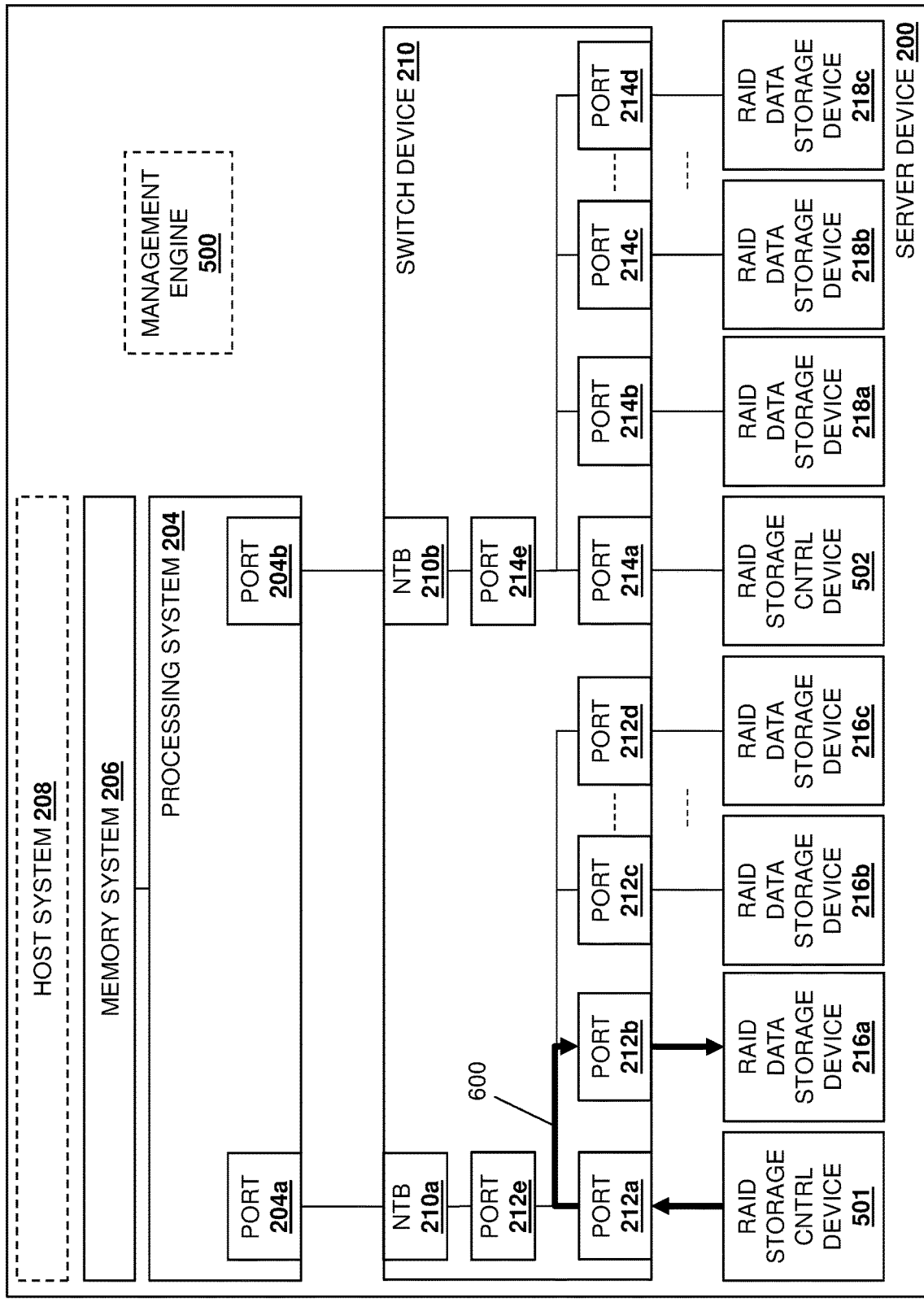
FIG. 6B is a schematic view illustrating an embodiment of the RAID data storage system of FIG. 5 operating during the method of FIG. 4.
Figure 6C:
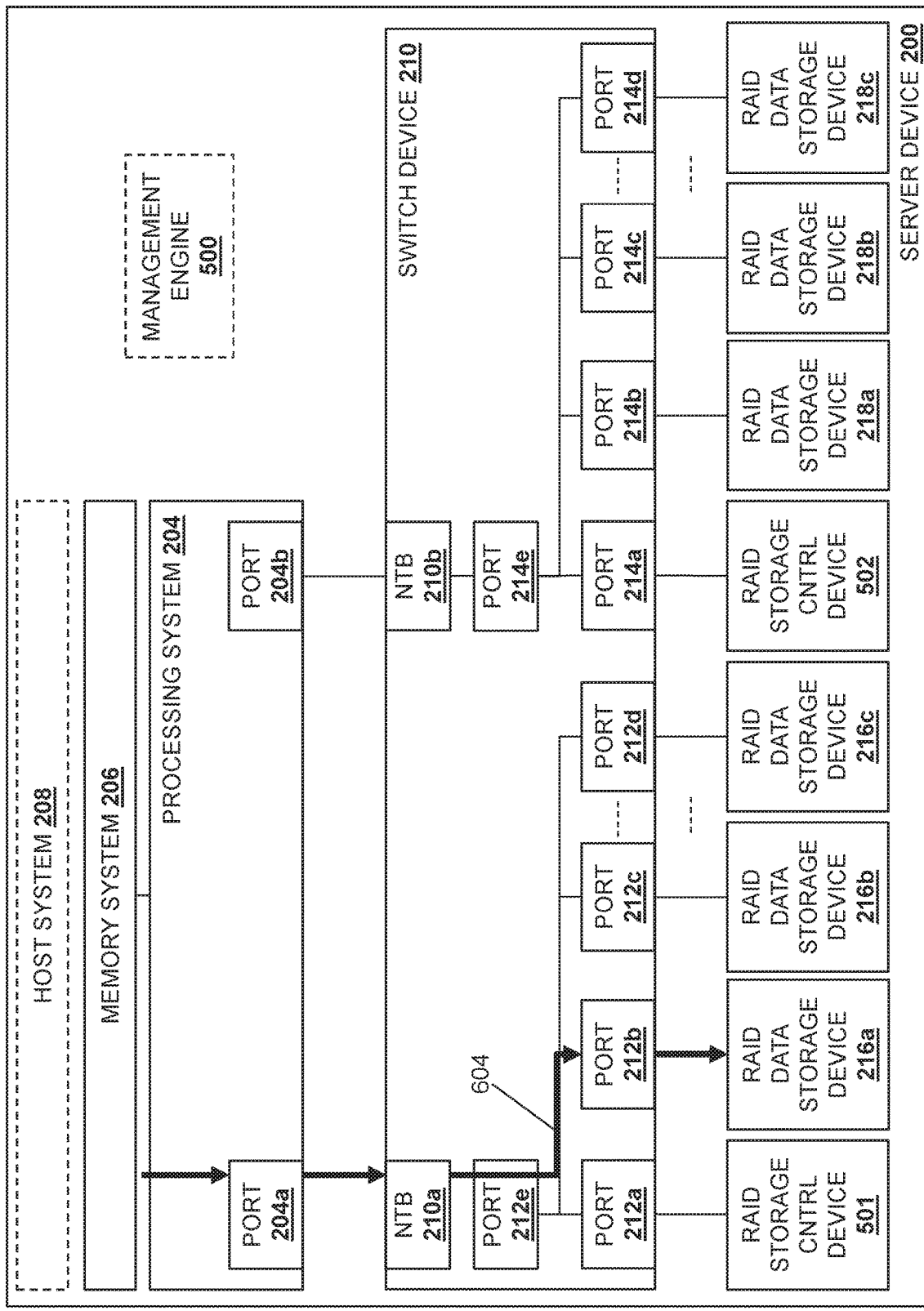
FIG. 6C is a schematic view illustrating an embodiment of the RAID data storage system of FIG. 5 operating during the method of FIG. 4.

An example of the performance of a simple write command at block 408 to write data associated with the host system 208 (e.g., stored in the memory system 206) to a RAID data storage system will now be described, but one of skill in the art in possession of the present disclosure will recognize that other data transfer operations may be performed in response to a variety of commands at block 408 while remaining within the scope of the present disclosure as well. Thus, continuing with the example illustrated in FIG. 6A, the RAID storage controller engine in the RAID storage controller device 501 may receive the write command 600 and, in response, determine that the write command 600 should be forwarded to the RAID data storage device 216*a*. As such, as illustrated in FIG. 6B, the RAID storage controller engine in the RAID storage controller device 501 may forward the write command 600 to the switch device 210, and in response to receiving the write command 600 via the port 212*a*, the switch device 210 may forward the write command 600 via the port 212*b* to the RAID data storage device 216*a*.

As discussed above, a write commands is discussed being provided to the RAID data storage device 216*a* above, one of skill in the art in possession of the present disclosure that other types of commands may be provided to other RAID data storage devices in the first and second RAID data storage systems while remaining within the scope of the present disclosure as well. For example, the RAID storage controller devices 501 and 502 may perform data mirroring operations in their RAID data storage systems, respectively, by sending multiple commands to different ones of the RAID data storage devices 216*a*-216*c* and 218*a*-218*c*, respectively. As would be appreciated by one of skill in the art in possession of the present disclosure, the data mirroring operations performed in the first RAID data storage system discussed above may include the host system 208 issuing a write command to the NTB subsystem 210*a* (which presents itself as an NVMe RAID data storage device), and the NTB subsystem 210*a* may provide that write command to the RAID storage controller device 501. The RAID storage controller device 501 may then issue that same write command to two of the RAID data storage devices 216*a*-216*c* in order to mirror the data being written, while sending back a single completion communication to the host system 208. One of skill in the art in possession of the present disclosure will appreciate that a variety of other RAID operations may be performed according to the teachings of the present disclosure in a similar manner.

In an embodiment of block 408 and in response to receiving the write command 600, the RAID data storage device 216*a* may perform a Direct Memory Access (DMA) operation 604 that may include transmitting a memory address identification communication that identifies memory address(es) in the memory system 206 that include the data that was identified in the write command 600. As discussed above, the NTB system 210*a* may be configured to claim memory addresses that are included in the memory system 206 and identified as part of a DMA operation and, as such, at block 408 and in response to the switch device 210 receiving the memory address identification communication, the NTB system 210*a* may claim the DMA operation 604 being performed by the RAID data storage device 216*a* and, in response, provide a DMA operation request communication via the NTB subsystem 210*a* to the processing subsystem 202 that identifies those memory address(es). In response to receiving the DMA operation request communication via its port 204*a*, the processing subsystem 202 may allow the DMA operation 604 that includes the RAID data storage device 216*a* retrieving the data from the memory address(es) in the memory system 206 that was identified in the write command 600 directly from the memory subsystem 206 and via the processing subsystem 202 and the switch device 210. However, while the performance of a simplified write operations is described, one of skill in the art in possession of the present disclosure will appreciate that write operations may involve more complex operations (e.g., the updating of parity data for a data stripe that includes the primary data that was updated in response to the write command) while remaining within the scope of the present disclosure as well.

Figure 6D:
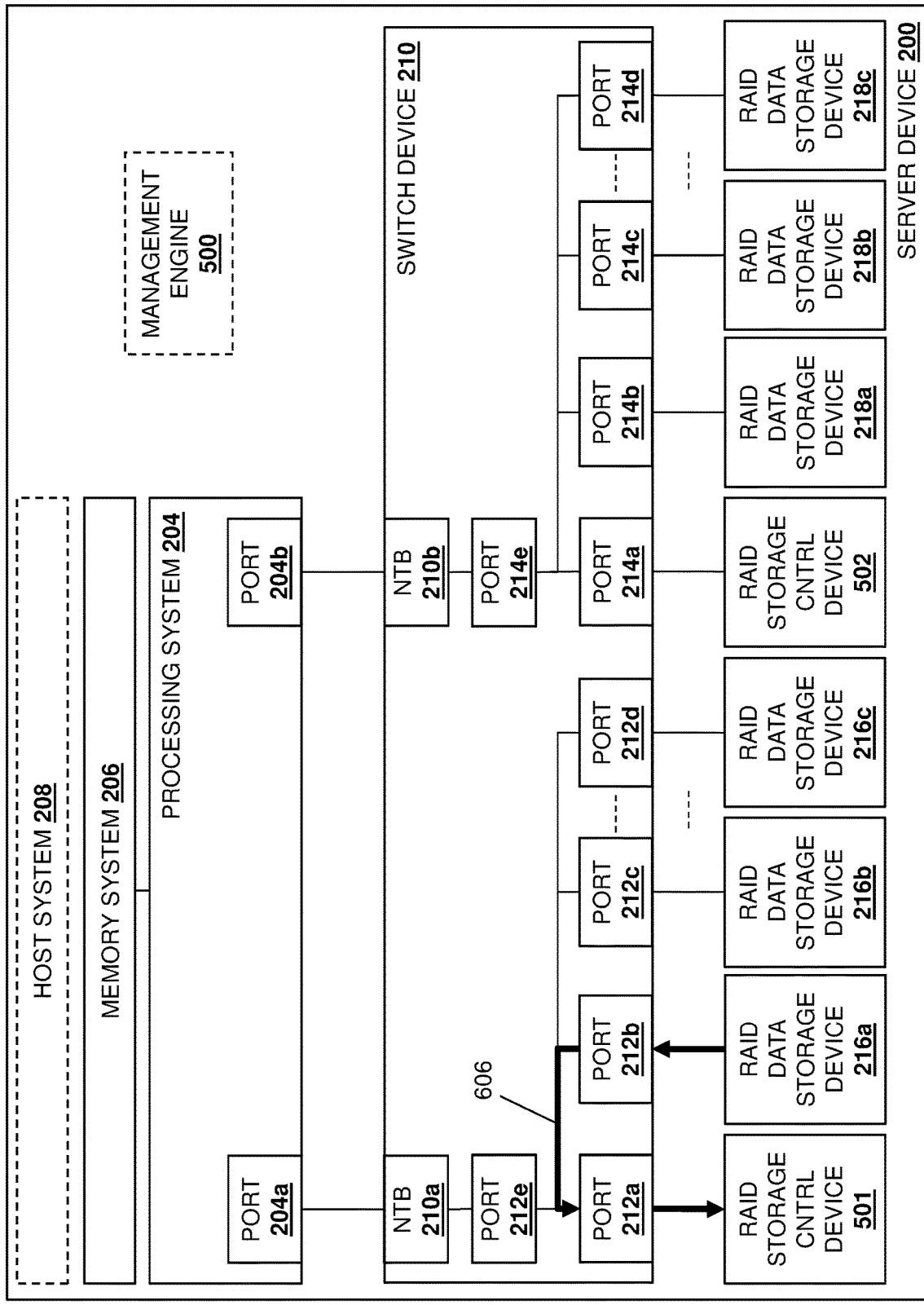
FIG. 6D is a schematic view illustrating an embodiment of the RAID data storage system of FIG. 5 operating during the method of FIG. 4.
Figure 6E:
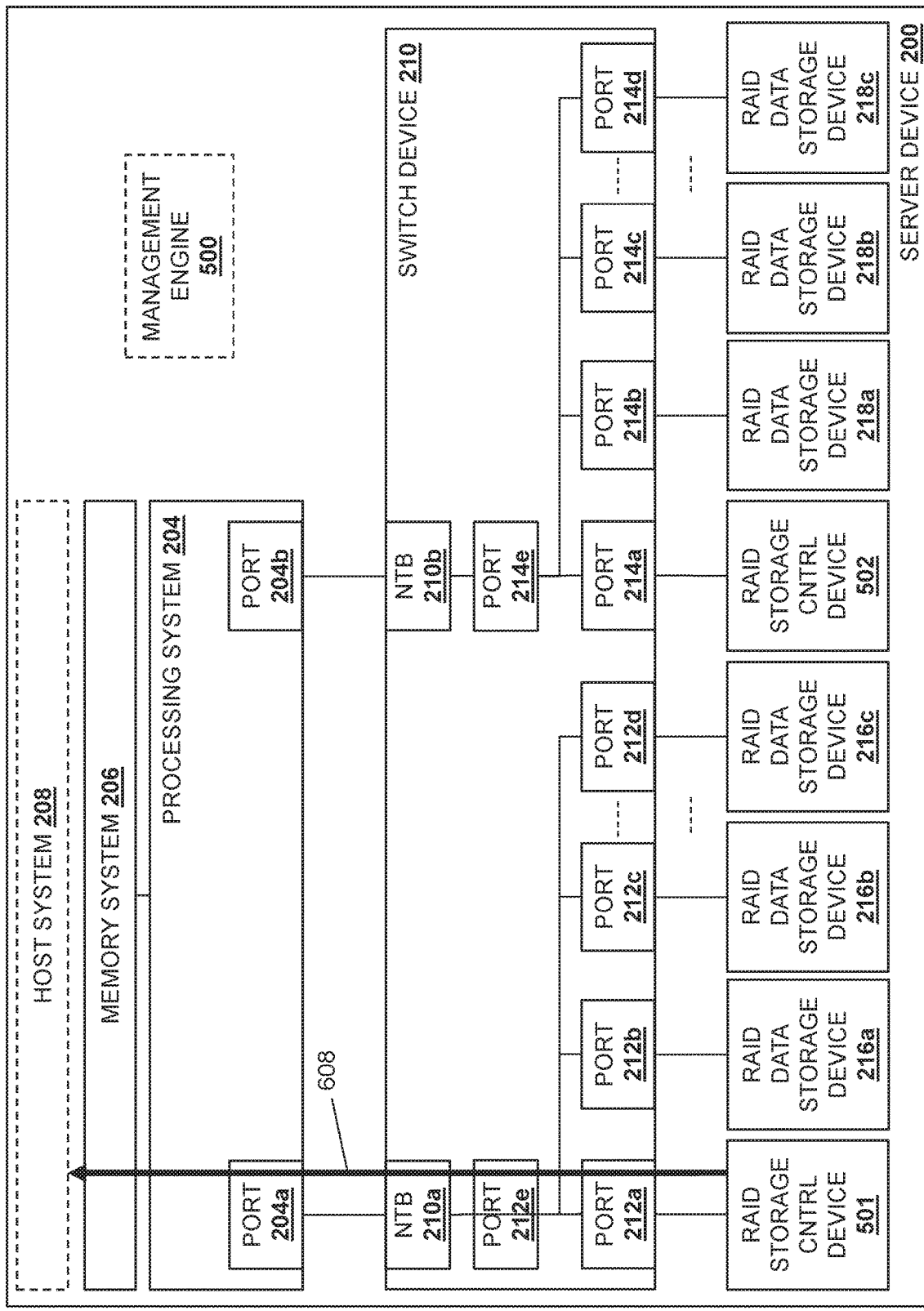
FIG. 6E is a schematic view illustrating an embodiment of the RAID data storage system of FIG. 5 operating during the method of FIG. 4.

Following the completion of the DMA operation 604, the RAID data storage device 216*a* may transmit a completion message 606 that acknowledges the completion of the write command 600 via the switch device 210 (e.g., via the port 212*b*) and to the RAID storage controller device 501 (e.g., via the port 212*a*), as illustrated in FIG. 6D. In response to receiving the completion message 606, the RAID storage controller engine in the RAID storage controller device 501 may transmit a completion message 608 that acknowledges the completion of the write command 600 via the switch device 210 (e.g., via the port 212*a*) and to the host system 208/processing system 206 (e.g., via the NTB subsystem 210*a*), as illustrated in FIG. 6E. followed by an interrupt that causes the host system 208/processing subsystem 202 to retrieve that completion message. However, while specific completion acknowledgement techniques are described above, one of skill in the art in possession of the present disclosure will recognize that other completion acknowledgements (e.g., completion polling, etc.) will fall within the scope of the present disclosure as well. As such, the RAID storage controller devices of the present disclosure (e.g., the RAID storage controller devices 501 and 502 discussed above) may control their respective first and second RAID data storage systems that include subsets of the RAID data storage devices provided in the server device 200.

The method 400 then proceeds to decision block 410 where it is determined whether a second RAID storage controller device has become unavailable. In an embodiment, at decision block 410, the method 400 may proceed based on whether another RAID storage controller device has become unavailable. As discussed below, in the event a RAID storage controller device in the server device becomes unavailable, another RAID storage controller device may operate to take over the operations of that unavailable RAID storage controller device in order to control its RAID data storage system. Thus, if at decision block 410 it is determined that a second RAID storage controller device has not become unavailable, the method 400 returns to block 406. As such, the method 400 may loop such that RAID data storage devices (e.g., the RAID data storage devices 501 and 502) operate to receive and perform commands with the RAID data storage devices (e.g., the RAID data storage devices 216*a*-216*c* and 218*a*-218*c*) in their RAID data storage systems.

Figure 7A:
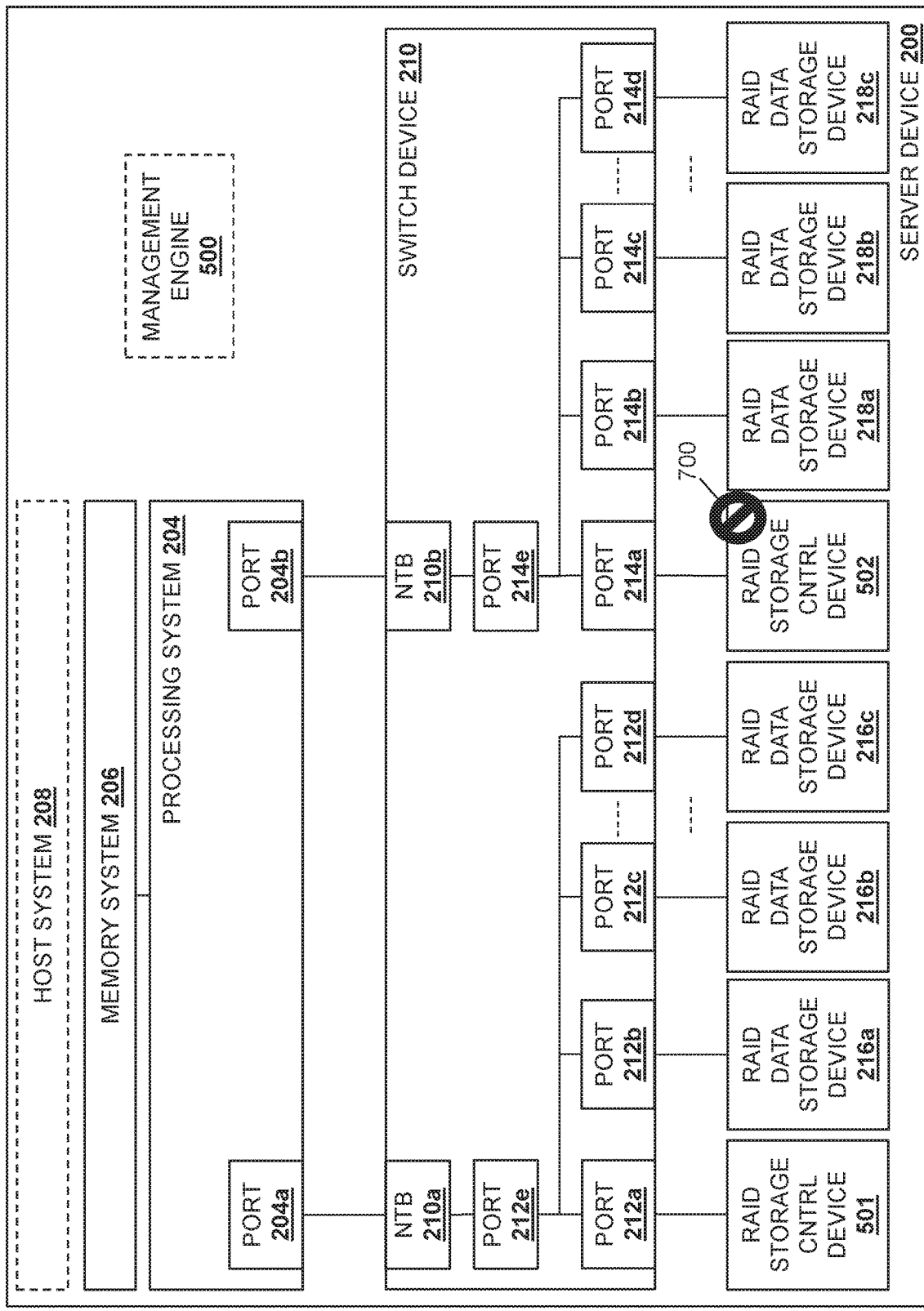
FIG. 7A is a schematic view illustrating an embodiment of the RAID data storage system of FIG. 5 operating during the method of FIG. 4.
Figure 7B:
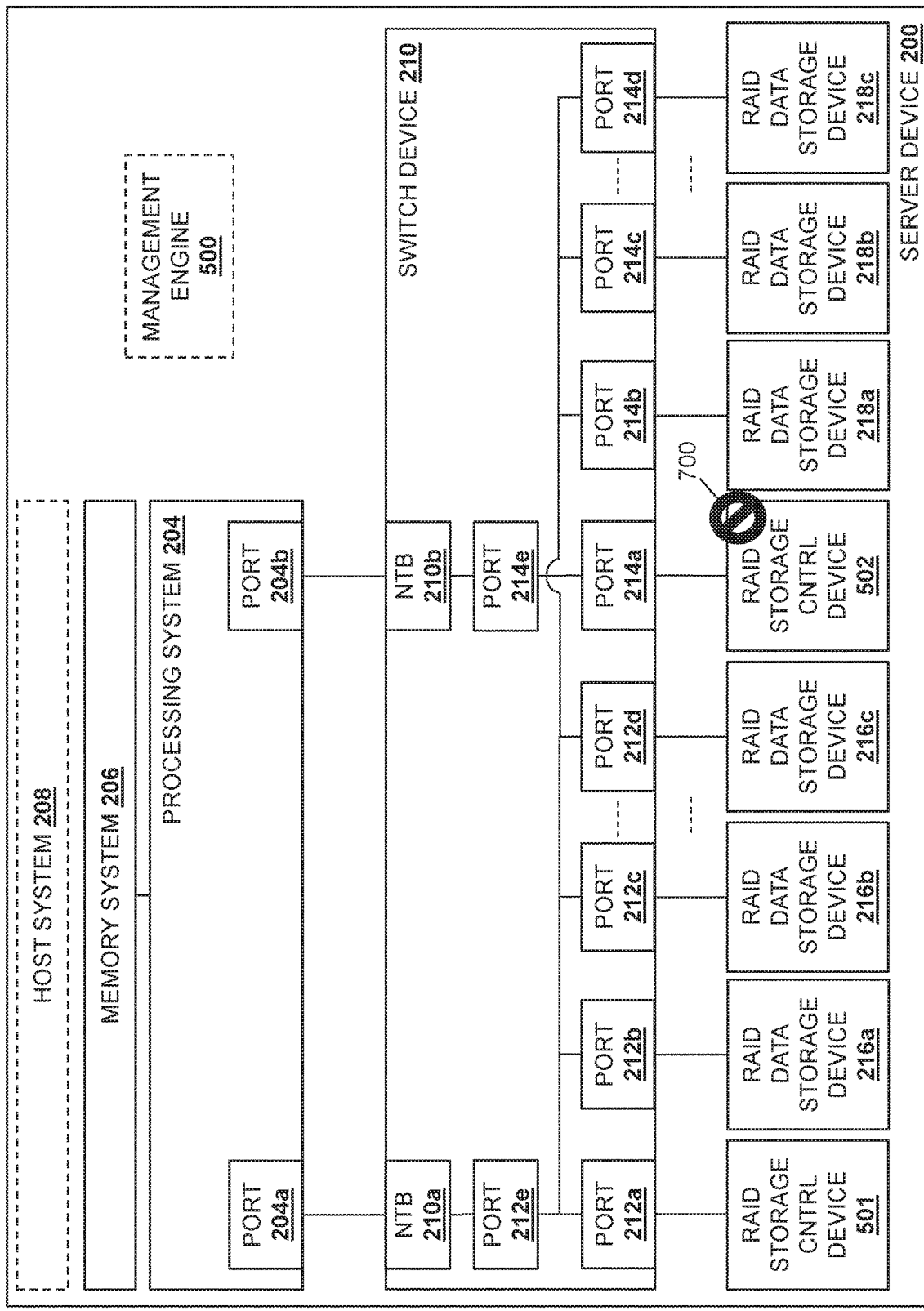
FIG. 7B is a schematic view illustrating an embodiment of the RAID data storage system of FIG. 5 operating during the method of FIG. 4.

If, at decision block 410, it is determined that a second RAID storage controller device has become unavailable, the method 400 proceeds to block 412 where the first RAID storage controller device is connected to second RAID data storage devices that are located in the storage device bay to provide a second RAID data storage system. With reference to FIG. 7A, in an embodiment of block 412, the RAID storage controller device 502 may fail or otherwise become unavailable (as indicated by element 700 in FIG. 7A). In some embodiments, the management engine 500 may be configured to detect the unavailability of the RAID storage controller device 502 and, in response, reconfigure the switch device 210 to connect the RAID data storage devices 218a-218c to the RAID storage controller device 501. For example, with reference to FIG. 7B, the management engine 500 may reconfigure the connections provided by the switch device 210 in order to connect the ports 214b, 214c, and 214d to the NTB subsystem 210a and the port 212a in order to connect the RAID data storage devices 218a-218c to the NTB subsystem 210a and the RAID storage controller device 501.

As would be appreciated by one of skill in the art in possession of the present disclosure, a reconfiguration of the switch device 210 in order to connect the ports 214b, 214c, and 214d to the NTB subsystem 210a and the port 212a may be accompanied by a notification to the host system 208 so that commands directed to the second RAID storage system provided by the RAID data storage devices 218a, 218b, and 218c are issued to the NTB subsystem 210a (instead of the NTB subsystem 210b through which the second RAID storage system was previously accessed.) For example, in situations where the storage space provided by the RAID data storage devices 218a, 218b, and 218c is an NVMe storage space, the namespace provided by the RAID data storage devices 218a, 218b, and 218c would be deleted and the host system 208 would be notified, followed by the addition of the namespace provided by the RAID data storage devices 218a, 218b, and 218c using the RAID storage controller device 501 and another notification to the host system 208. One of skill in the art in possession of the present disclosure will appreciate that a unique identifier of the namespace provided by the RAID data storage devices 218a, 218b, and 218c would not change during this process, which allows the host system 208 to recognize that namespace once it is accessible via the RAID storage controller device 501.

The method 400 then proceeds to block 414 where the first RAID storage controller device receives a command from the host system. In an embodiment, in response to being connected to the RAID storage controller devices 218a, 218b, and 218c, the RAID storage controller device 501 may operate to check a journal maintained by the RAID storage controller device 502 to determine a current configuration and state of the second RAID data storage system that includes the RAID data storage devices 218a-218c, complete any outstanding actions/commands to the second RAID data storage system, and perform subsequent commands directed to the second RAID data storage system. As will be appreciated by one of skill in the art in possession of the present disclosure, the RAID storage controller device 502 may maintain the journal in a memory system that is accessible to the host system 208 when the RAID storage controller device 502 is unavailable (i.e., a memory system that is outside the RAID storage controller device 502 such as the memory system 206) in order to keep that journal available to the RAID storage controller device 501 when the RAID storage controller device 502 is unavailable.

Figure 7C:
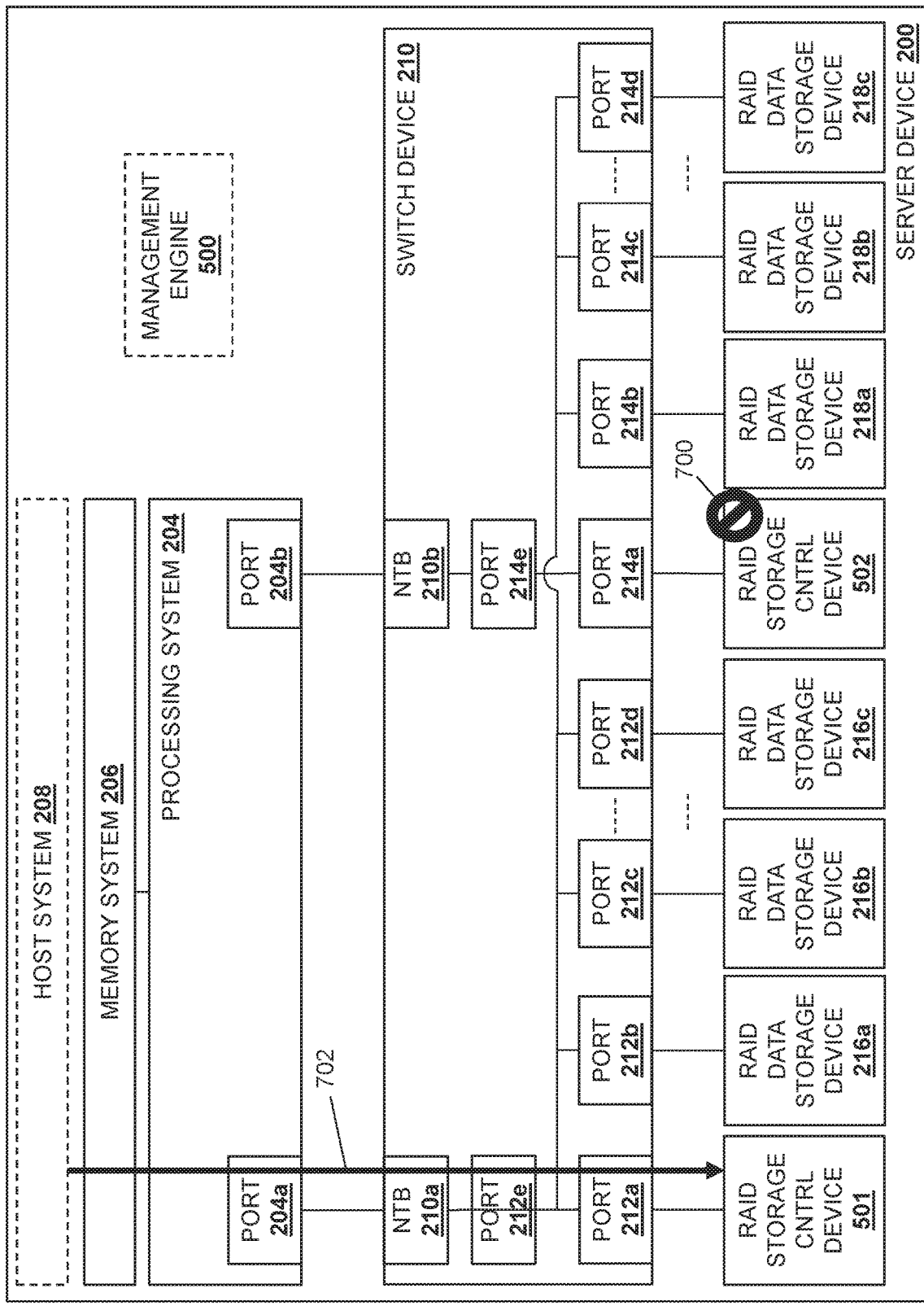
FIG. 7C is a schematic view illustrating an embodiment of the RAID data storage system of FIG. 5 operating during the method of FIG. 4.

As illustrated in FIG. 7C, in an embodiment of block 414, the RAID storage controller device 501 may receive a command 702 from the host system 208 in substantially the same manner as described above for block 406 of the method 400, but the command 702 may instruct a data transfer operation associated with the second RAID storage system provided by the RAID data storage devices 218a-218c. The method 400 then proceeds to block 416 where the first RAID storage controller device performs the command using second RAID data storage devices in its second RAID data storage system. In an embodiment, at block 416, the RAID storage controller device 501 may perform/execute the command 702 in substantially the same manner as described above for block 408 of the method 400, but with the performance of the command 702 providing for a data transfer operation using at least some of the RAID data storage devices 218a-218c. As such, any RAID storage controller device provided according to the teachings of the present disclosure may provide "fail-over" for other RAID storage controller devices provided according to the teachings of the present disclosure.

Figure 8:
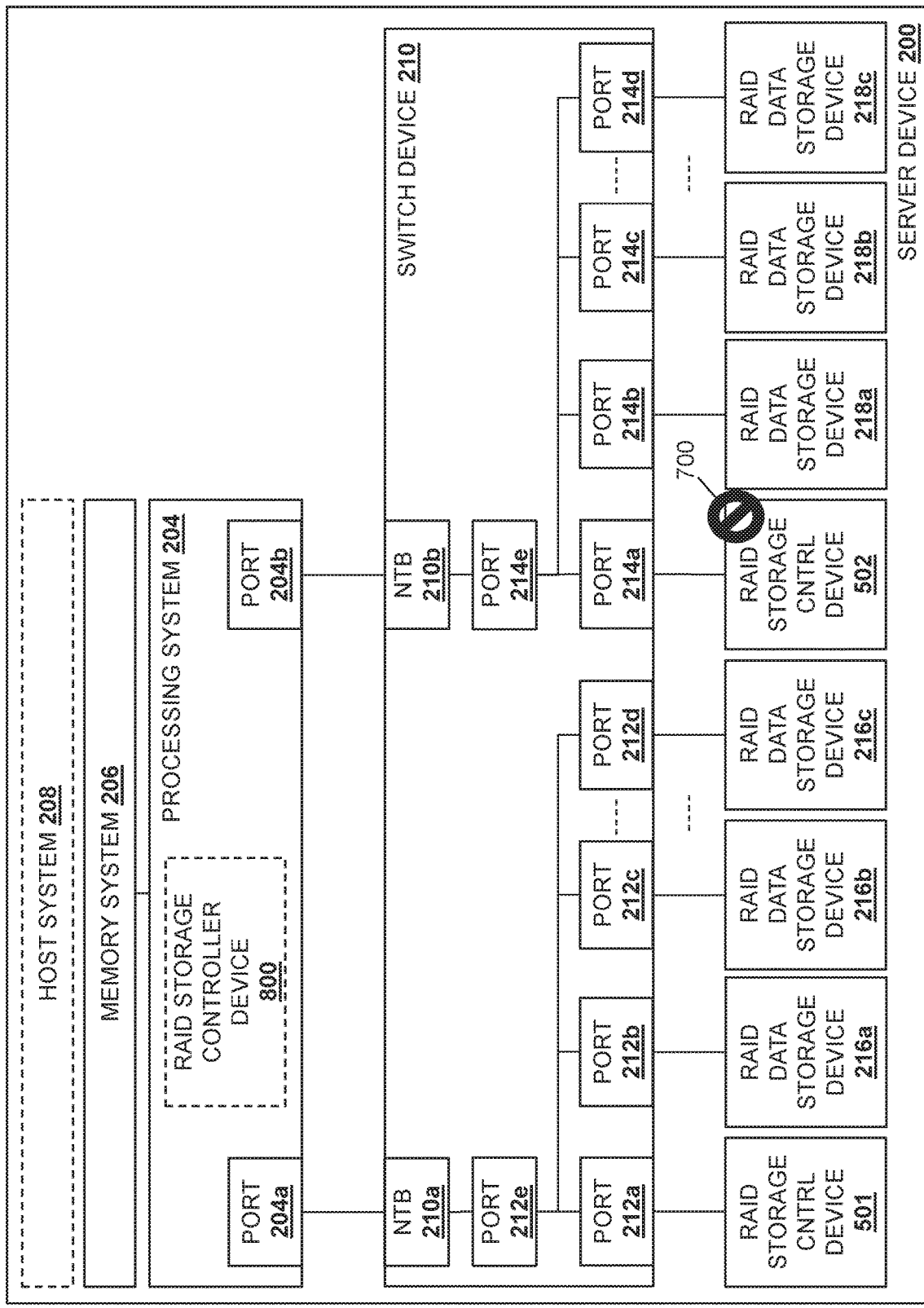
FIG. 8 is a schematic view illustrating an embodiment of the RAID data storage system of FIG. 5 operating during the method of FIG. 4.

As illustrated in FIG. 8, in some embodiments, the processing system 204 may execute instructions stored on the memory system 206 to provide a "software" RAID storage controller device 800 that includes similar functionality as the RAID storage controller devices 501 and 502 discussed above. In some embodiment, in response to the unavailability of a RAID storage controller device (e.g., the unavailability of the RAID storage controller device 502 illustrated in FIG. 8 above), the "software" RAID storage controller device 800 may operate similarly as the RAID storage controller device 501 discussed above with reference to FIGS. 7A-7C to provide a "fail-over" for the RAID storage controller device 502. For example, in response to the unavailability of the RAID storage controller device 502 (e.g., due to a PCIe bus error, a command timeout, the failure or removal of a hot-plugged RAID storage controller device, and/or other unavailability situation known in the art), the Basic Input/Output System (BIOS) in the server device 200 may "hot remove" the RAID storage controller device 502 from the PCIe hierarchy and expose the RAID data storage devices 218a-218c directly to the host system 208 (as illustrated in FIG. 8.)

The host system 208 may then bring the "software" RAID storage controller device 800 online, and the "software" RAID storage controller device 800 would operate to check a journal maintained by the RAID storage controller device 502 to determine a current configuration and state of the second RAID data storage system that includes the RAID data storage devices 218a-218c, complete any outstanding actions/commands to the second RAID data storage system, and perform subsequent commands directed to the second RAID data storage system. As will be appreciated by one of skill in the art in possession of the present disclosure, the RAID storage controller device 502 may maintain the journal in a memory system that is accessible to the host system 208 when the RAID storage controller device 502 is unavailable (i.e., a memory system that is outside the RAID storage controller device 502 such as the memory system 206) in order to keep that journal available to the "software" RAID storage controller device 800 when the RAID storage controller device 502 is unavailable. As will be appreciated by one of skill in the art in possession of the present disclosure, upon the subsequent availability of the RAID storage controller device 502 (or its replacement with an available RAID storage controller device), the RAID storage controller device 502 may be configured to take over the control of the second RAID storage system from the "software" RAID storage controller device 800.

Thus, systems and methods have been described that provide RAID storage controller devices in storage controller device chassis that have a storage device form factor that is the same as the storage device chassis utilized by the RAID data storage devices which those RAID storage controller device control. As such, the RAID storage controller devices of the present disclosure may be provided in the same storage device bay defined by a server device chassis as the RAID data storage devices, which allows respective RAID storage controller devices to be connected to respective subsets of the RAID data storage devices to provide respective RAID data storage systems in the server device. Thus, the RAID storage controller devices of the present disclosure may scale with relatively high performance RAID data storage devices (such as the NVMe storage devices discussed above) in a RAID data storage system by providing respective RAID storage controller devices to control each subset of those RAID data storage devices that they are capable of controlling, with the RAID storage controller devices provided in storage devices slots and connected to storage device connectors rather than using up device connectors (e.g., peripheral device connectors such as PCIe card add-in slots) that could otherwise be used for other types of devices.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A scalable Redundant Array of Independent Disks (RAID) storage controller device system, comprising:
   a host system;
   a switch device that includes a plurality of switch ports and that is coupled to the host system by a first Non-Transparent Bridge (NTB) subsystem and a second NTB subsystem;
   a plurality of first Redundant Array of Independent Disks (RAID) data storage devices that are each provided in a respective first data storage device chassis having a storage device form factor and including a first type storage device connector, and that are each directly connected to a respective one of the switch ports on the switch device via their respective first type storage device connector on their first data storage device chassis;
   a first RAID storage controller device that is:
      provided in a first storage controller device chassis having the storage device form factor and including the first type storage device connector;
      directly connected to one of the switch ports on the switch device via the first type storage device connector on its first storage controller device chassis to couple the first RAID storage controller device to the plurality of first RAID data storage devices to provide a first RAID data storage system; and
      configured to receive a first command for the first RAID data storage system via the first NTB subsystem from the host system;
   a plurality of second RAID data storage devices that are each provided in a respective second data storage device chassis having the storage device form factor and including the first type storage device connector, and that are each directly connected to a respective one of the switch ports on the switch device via their respective first type storage device connector on their second data storage device chassis; and
   a second RAID storage controller device that is:
      provided in a second storage controller device chassis having the storage device form factor and including the first type storage device connector;
      directly connected to one of the switch ports on the switch device via the first type storage device connector on its first storage controller device chassis to couple the second RAID storage controller device to the plurality of second RAID data storage devices to provide a second RAID data storage system; and
      configured to receive a second command for the second RAID data storage system via the second NTB subsystem from the host system,
      wherein each of the first storage controller device chassis and the second storage controller device chassis are separate from each other, the first data storage device chassis, and the second data storage device chassis.

2. The system of claim 1, wherein the first type storage device connector for each of the plurality of first RAID data storage devices, the first RAID storage controller device, the second RAID data storage devices, and the second RAID storage controller device is provided by a respective SFF-8639 connection system.

3. The system of claim 1, wherein each of the first RAID storage controller device and the second RAID storage controller device are configured to be hot-plugged to the switch device.

4. The system of claim 1, further comprising:
   a third RAID storage controller device that is coupled via the switch device to the plurality of first RAID data storage devices and the plurality of second RAID data storage devices, wherein the third RAID storage controller device is configured to:
      provide the first RAID data storage system and receive the first commands for the first RAID data storage system from the host system in the event the first RAID storage device becomes unavailable; and
      provide the second RAID data storage system and receive the second commands for the second RAID data storage system from the host system in the event the second RAID storage device becomes unavailable.

5. The system of claim 4, wherein the third RAID storage controller device is a software RAID storage controller device.

6. The system of claim 1, wherein the first RAID storage controller device is coupled via the switch device to the plurality of second RAID data storage devices, and wherein the first RAID storage controller device is configured to:
   provide the second RAID data storage system and receive the second commands for the second RAID data storage system via the first NTB subsystem from the host system in the event the second RAID storage controller device becomes unavailable.

7. An Information Handling System (IHS), comprising:
   a Redundant Array of Independent Disks (RAID) storage controller chassis having a storage device form factor and including a first type storage device connector;
   a RAID storage controller processing system that is housed in the RAID storage controller chassis and that is coupled to the first type storage device connector on the RAID storage controller chassis; and a RAID storage controller memory system that is housed in the RAID storage controller chassis, that is coupled to the RAID storage controller processing system, and that includes instructions that, when executed by the RAID storage controller processing system, cause the RAID storage controller processing system to provide a RAID storage controller engine that is configured to:

provide, in response to the direct connection of the first type storage device connector on the RAID storage controller chassis to a switch port included on a switch device, a first RAID data storage system that includes a plurality of first RAID data storage devices that are each:
- provided in a respective first data storage device chassis that is separate from the RAID storage controller chassis, has the storage device form factor, and includes the first type storage device connector;
- directly connected to a respective switch port included on the switch device via the first type storage device connector on its first RAID data storage device chassis; and
- configured to store RAID data; and receive, via a first Non-Transparent Bridge (NTB) subsystem on the switch device, a first command for the first RAID data storage system that was generated by a host system; and perform the first command using at least one of the plurality of first RAID data storage devices.

8. The IHS of claim 7, wherein the first type storage device connector is an SFF-8639 connector.

9. The IHS of claim 7, wherein the RAID storage controller engine is configured to be hot-plugged to the switch device in response to the direct connection of the first type storage device connector on the RAID storage controller chassis to the switch device while at least one of the plurality of first RAID data storage devices are operating.

10. The IHS of claim 7, wherein the RAID storage controller engine is coupled via the switch device to a plurality of second RAID data storage devices, and wherein the first RAID storage controller engine is configured to:

provide, in response to an unavailability of a RAID storage controller device that is connected via the switch device to the plurality of second RAID data storage devices to provide a second RAID data storage system, the second RAID data storage system;

receive, via the first NTB subsystem on the switch device, a second command for the second RAID data storage system that was generated by the host system; and perform the second command using at least one of the plurality of second RAID data storage devices.

11. The IHS of claim 7, wherein the RAID storage controller engine is configured to:

takeover, in response to the connection of the first type storage device connector on the RAID storage controller chassis to the switch device, the provisioning of the first RAID data storage system from a RAID storage controller device.

12. The IHS of claim 11, wherein the RAID storage controller device is a software RAID storage controller device.

13. The IHS of claim 7, wherein the RAID storage controller engine is configured to:

provide a journal entry for the first command in a memory system that is accessible to the host system.

14. A method for providing scalable Redundant Array of Independent Disks (RAID) storage controller devices, comprising:

providing, by a first RAID storage controller device that is provided in a first storage controller device chassis having a storage device form factor and in response to a direct connection of a first type storage device connector on the first storage controller device chassis to a switch port on a switch device, a first RAID data storage system that includes a plurality of first RAID data storage devices that are each:
- provided in a respective first data storage device chassis that is separate from the first storage controller device chassis, has the storage device form factor, and includes a first type storage device connector; and
- directly connected to a respective one of the switch ports on the switch device via their respective first type storage device connector on their first data storage device chassis;

receiving, by the first RAID storage controller device via a first Non-Transparent Bridge (NTB) subsystem on the switch device, a first command for the first RAID data storage system that was generated by a host system; and performing, by the first RAID storage controller device, the first command using at least one of the plurality of first RAID data storage devices.

15. The method of claim 14, wherein the first type storage device connector is an SFF-8639 connector.

16. The method of claim 14, wherein the first RAID storage controller device is configured to be hot-plugged to the switch device.

17. The method of claim 14, wherein the first RAID storage controller device is coupled via the switch device to a plurality of second RAID data storage devices, and wherein the method further comprises:

providing, by the first RAID storage controller device in response to an unavailability of a second RAID storage controller device that is connected via the switch device to the plurality of second RAID data storage devices to provide a second RAID data storage system, the second RAID data storage system;

receiving, by the first RAID storage controller device via the first NTB subsystem on the switch device, a second command for the second RAID data storage system that was generated by the host system; and performing, by the first RAID storage controller device, the second command using at least one of the plurality of second RAID data storage devices.

18. The method of claim 14, further comprising:

takeover, by the first RAID storage controller device in response to the connection of the first type storage device connector on the first storage controller device chassis to the switch device, the provisioning of the first RAID data storage system from a second RAID storage controller device.

19. The method of claim 18, wherein the second RAID storage controller device is a software RAID storage controller device.

20. The method of claim 14, further comprising:

providing, by the first RAID storage controller device, a journal entry for the first command in a memory system that is accessible to the host system.

* * * * *